United States Patent [19]
Sato et al.

[11] Patent Number: 5,852,791
[45] Date of Patent: Dec. 22, 1998

[54] VEHICLE NAVIGATION WITH VEHICLE POSITION CORRECTION FEATURE

[75] Inventors: Yoshikazu Sato, Iwaki; Kan Shishido, Haga-gun, both of Japan

[73] Assignees: Alpine Electronics; Honda Giken Kogyo Kabushiki Kaisha

[21] Appl. No.: 755,270

[22] Filed: Nov. 22, 1996

[30] Foreign Application Priority Data

Dec. 28, 1995 [JP] Japan .................................. 7-342644

[51] Int. Cl.⁶ .............................................. G06F 165/00
[52] U.S. Cl. ...................... 701/217; 701/207; 701/209; 701/214; 340/988
[58] Field of Search .................................. 701/200, 207, 701/208, 209, 210, 211, 212, 217, 214, 216; 340/988, 990, 995; 73/178 R

[56] References Cited

U.S. PATENT DOCUMENTS

| | | | |
|---|---|---|---|
| 5,119,301 | 6/1992 | Shimizu et al. | 701/217 |
| 5,422,815 | 6/1995 | Hijikata | 701/208 |
| 5,552,990 | 9/1996 | Ihara et al. | 701/208 |
| 5,703,780 | 12/1997 | Takanabe et al. | 701/209 |

*Primary Examiner*—Jacques H. Louis-Jacques
*Assistant Examiner*—Gertrude Arthur
*Attorney, Agent, or Firm*—Skjerven, Morrill, MacPherson, Franklin & Friel LLP; Norman R. Klivans

[57] ABSTRACT

A vehicle navigation system enables a recognized vehicle position to be corrected to be a position on the correct road even if the vehicle position has been erroneously determined to be on a wrong road, after passing a branching point. A first map matching processing section obtains a most probable candidate road and other candidate roads by map matching processing after passing a branching point, and corrects the vehicle position to a position on the most probable candidate road, the corrected position being regarded as representing the actual vehicle position. A second map matching section corrects the dead-reckoned vehicle position to be a position on another candidate road, and sets the corrected position as a temporary vehicle position. Thereafter, the map matching processing sections perform first map matching processing based on the actual vehicle position and second map matching based on the temporary vehicle position each time a predetermined distance is traveled, in parallel with each other. When the first map matching processing finds no road on which map matching is to be performed, the first map matching is continued by setting the temporary vehicle position as the actual vehicle position.

19 Claims, 18 Drawing Sheets

FIG. 2
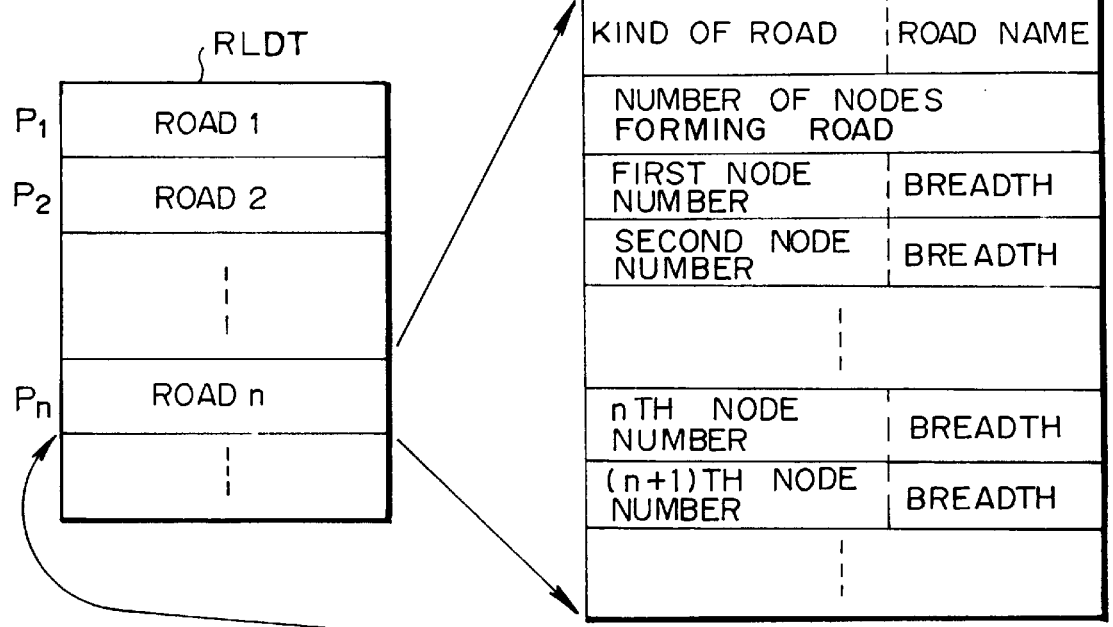
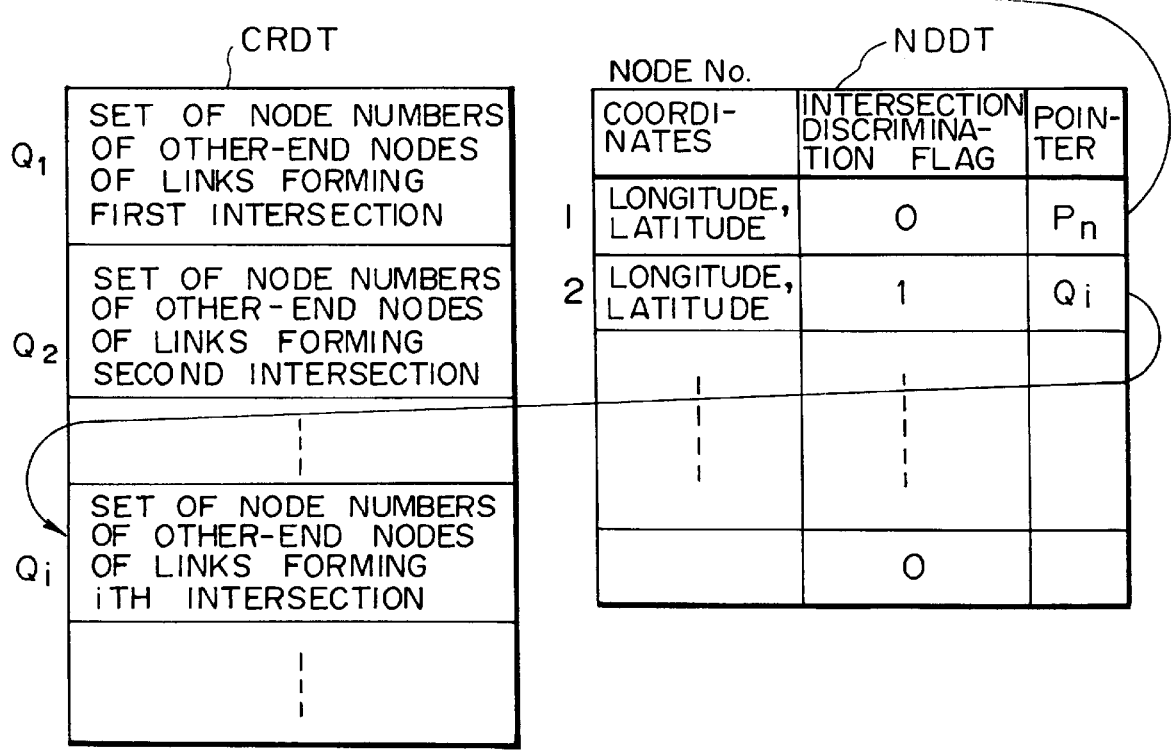

— GUIDE ROUTE
• NODE

FIG. 16
PRIOR ART

| SPEECH GUIDANCE |
|---|
| GO STRAIGHT THROUGH THE NEXT INTERSECTION |
| TURN RIGHT AT THE NEXT INTERSECTION |
| TURN OFF TO THE RIGHT AT THE NEXT INTERSECTION |
| TURN LEFT AT THE NEXT INTERSECTION |
| TURN OFF TO THE LEFT AT THE NEXT INTERSECTION |

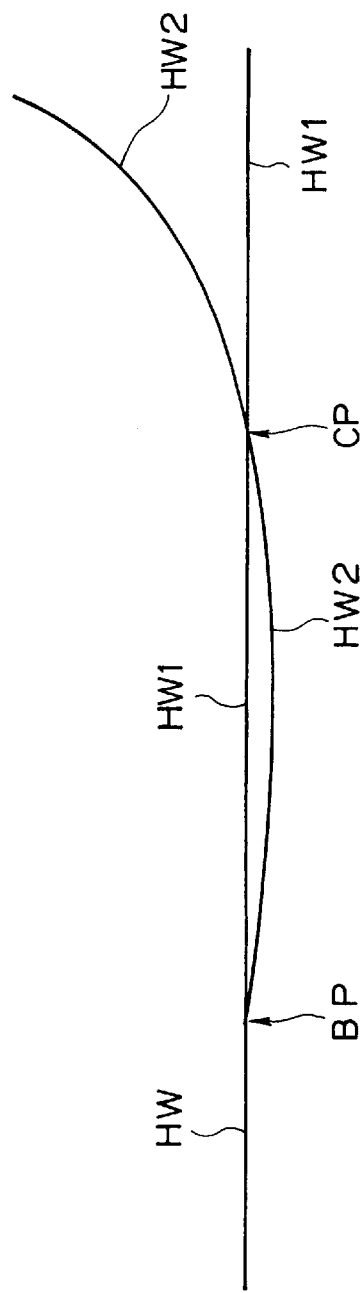
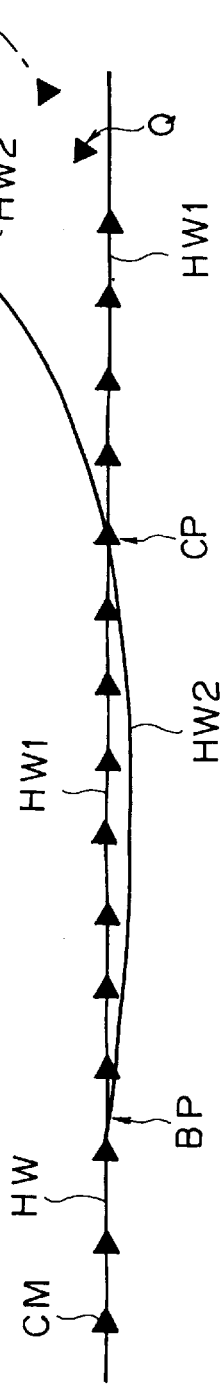

VEHICLE NAVIGATION WITH VEHICLE POSITION CORRECTION FEATURE

BACKGROUND

1. Field of the Invention

The present invention relates to vehicle navigation systems and especially to correcting the position of a vehicle as recognized by a vehicle navigation system.

2. Description of the Related Art

A vehicle navigation apparatus of a well known type performs vehicle travel guidance, enabling a driver to easily drive the vehicle to a selected destination. The navigation apparatus detects the position of the vehicle, reads out map data pertaining to an area at the vehicle position from e.g. a CD-ROM (compact disk read-only memory), and displays a map image on a display screen while superposing a mark representing the position of the vehicle (a vehicle position mark) on a predetermined portion of the map image. As the present position of the vehicle changes with the travel of the vehicle, the vehicle position mark in the image is moved or the map is scrolled while the vehicle position mark is fixed at a predetermined position, for example, at the center of the image, thereby enabling the driver (user) to recognize the map information of the area at (i.e. around) the vehicle position at a glance.

Such a navigation apparatus has a route guidance function for setting a guided route from a starting point to a destination and performing intersection guidance (displaying an enlarged intersection diagram and the direction in which the vehicle is to travel) while displaying the guide route on a map. When a starting point and a destination are input, a guided route control section of the navigation apparatus automatically determines a most suitable guided route and successively stores nodes (expressed in longitude and latitude) constituting the guided route in a memory. During actual traveling, the node series stored in the memory is searched for a portion of the guided route to be displayed in a map display area of a display screen, and the portion of the guided route is displayed so as to be discriminable from other routes. When the vehicle is within a predetermined distance of an intersection it is approaching, an intersection guidance diagram (an enlarged intersection diagram with an arrow indicating the direction in which the vehicle is to turn at the intersection) is displayed to inform a driver of the desired one of roads or directions selectable at the intersection.

Some types of navigation apparatus inform the driver of the direction in which he is to drive.

FIG. 14 is a diagram of an example of a guide route display containing a vehicle mark CM, a guided route RT (dotted line) and an enlarged intersection diagram EL1 of an intersection Q. The enlarged intersection diagram EL1 showing intersection formation links B1 to B4 represented by link figures having a predetermined width is converted into a perspective view (as shown) before being displayed. Each link is displayed with a name of a place to which a corresponding route leads (OHMIYA, TOKOROZAWA, URAWA STATION, NIHONBASHI). An arrow ARR is also displayed to indicate the direction in which the guided route leads to the destination. To draw such an enlarged intersection diagram, as shown in FIG. 14, an area through 360° around the intersection Q is divided into eight equal sections symmetrical about the direction of entry into the intersection (the direction of an intersection entry link L1), thereby obtaining eight angular ranges (reverse-to-entry-direction range A1, off-to-lower-left range A2, left turn range A3, off-to-upper-left range A4, straight drive range A5, off-to-upper-right range A6, right turn range A7, off-to-lower-right range A8). Then the relationship between intersection formation links and the angular ranges is examined to determine the angular ranges within which the intersection formation links fall, and an enlarged intersection diagram is formed and drawn in which the entry and diverging links extend in directions corresponding to the angular ranges within which the intersection formation links fall.

FIG. 16 is a table showing sentences of spoken intersection guidance. If the direction of an exit link corresponds to the right turn direction, spoken guidance such as "Turn right at the next intersection" is given. If the direction of an exit link corresponds to the off-to-upper-left direction, spoken guidance such as "Turn off to the left at the next intersection" is given. In some navigation systems, intersection guidance is not performed driving straight through the intersection.

The vehicle navigation apparatus described above is of the type commonly used in Japan. A vehicle navigation apparatus of the type commonly used in the U.S.A. displays guidance pictures as shown in FIGS. 17A to 17F, without displaying a map picture showing a map and a vehicle position mark during vehicle travel, and to guide the driver by using spoken information for designating the direction in which the driver is to drive. In each of the guidance pictures shown in FIGS. 17A to 17F, the distance (miles) to an intersection is indicated in space CDS; the distance (miles) to a destination is indicated in space DDS; a sign VCD indicates a state of performing spoken guidance; the present time is displayed in space TDL; and a heading direction is indicated in guidance image NVG. If there is no intersection or branching point on a guided route within a predetermined distance of the present vehicle position, a guidance picture such as FIG. 17A designating straight travel is displayed. If an intersection is being approached within the predetermined distance, a guidance picture such as one of FIGS. 17B to 17E is displayed which contains an enlarged diagram of the intersection or branching point and an arrow indicating a heading direction. If a U-turn is required, a U-turn figure as shown in FIG. 17F is displayed. When a point at a predetermined distance from the branching point or intersection is reached, spoken guidance is provided to designate a heading direction.

The vehicle position is determined by self-contained navigation sensors (e.g. a distance traveled sensor and a bearing sensor) mounted in the vehicle or by a global positioning system (GPS) including a satellite (satellite navigation). Vehicle position measurement based on self-contained navigation can be performed at lower cost, but problematically sensor errors reduce the measuring accuracy and therefore require correction processing, such as map matching processing. Satellite navigation enables absolute position detection. However, measured position data obtained by satellite navigation includes drift position errors from various causes. The nominal accuracy of the U.S. GPS system is 100 m or less (95% of the time). Satellite navigation also entails the problem of position detection failure in e.g. a tunnel or a building where the satellite radio signals are obstructed.

Vehicle navigation apparatuses using both self-contained navigation and satellite navigation have recently been developed to avoid such problems. In such navigation apparatuses, the position and bearing are dead-reckoned by self-contained navigation in an ordinary situation, and the dead-reckoned vehicle position is corrected by map matching processing to determine the actual vehicle position on a traveled road. If the navigation apparatus is disabled from map matching, so that the vehicle position measured by the self-contained navigation deviates from the actual vehicle position, such that the distance between the vehicle position measured by self-contained navigation and vehicle position measured by the GPS exceeds an error range of the GPS, then the position measured by the GPS is used as a corrected vehicle position, to find the traveled road by map matching processing, thereby determining the actual vehicle position.

In self-contained navigation, the vehicle position is detected by integrating signals output from a distance sensor and a relative direction sensor, as described below. FIG. 18 is a diagram of a vehicle position detection method using self-contained navigation. The distance sensor is assumed to output a pulse each time a unit distance $L_0$ is traveled by the vehicle. A reference bearing ($\theta=0$) corresponding to the plus direction of the X-axis is set, and the direction of counter-clockwise rotation from the reference bearing is assumed to be the plus direction. If a preceding vehicle position is represented by a point $P_0$ ($X_0$, $Y_0$), an absolute bearing of a vehicle heading at the point $P_0$ is $\theta_0$, and an output signal from the relative bearing sensor when the unit distance $L_0$ is traveled is $\Delta\theta_1$, a change in the vehicle position is represented by $$\Delta X = L_0 \cos(\theta 0 + \Delta\theta_1)$$

$$\Delta Y = L_0 \sin(\theta 0 + \Delta\theta_1).$$

A dead-reckoned bearing $\theta 1$ of the vehicle heading direction and a dead-reckoned vehicle position ($X_1$, $Y_1$) at a present point $P_1$ can be calculated by vector addition expressed by the following equations:

$$\theta_1 = \theta_0 + \Delta\theta_1 \qquad (1)$$

$$X_1 = X_0 + \Delta X = X_0 + L_0 \cos\theta 1 \qquad (2)$$

$$Y_1 = Y_0 + \Delta Y = Y_0 + L_0 \sin\theta 1 \qquad (3)$$

Accordingly, if the absolute bearing and the position coordinates at a starting point are given, the vehicle position can be detected (dead-reckoned) in real time by repeating the calculation of equations (1) to (3) each time the vehicle travels the unit distance.

In self-contained navigation, however, errors accumulate during traveling, so that the dead-reckoned position deviates from the traveled road. Therefore the dead-reckoned vehicle position is collated with road data by map matching processing to be corrected to the actual vehicle position on the road. FIGS. 19 and 20 are diagrams explaining map matching based on a projection method. It is assumed here that the present vehicle position is at a point $P_{i-1}$ ($X_{i-1}$, $Y_{i-1}$) and that the vehicle heading direction is $\theta_{i-1}$ (FIG. 19 shows the case where point $P_{i-1}$ does not coincide with a road RDa). If a relative bearing when a certain distance $L_0$ (e.g. 10 m) is traveled from the point $P_{i-1}$ is $\Delta\theta_i$, a vehicle position Pi' ($X_i'$, $Y_i'$) dead-reckoned by self-contained navigation and a dead-reckoned bearing $\theta_i$ at $P_i'$ are obtained by the following equations:

$$\theta_i = \theta_{i-1} + \Delta\theta_i$$

$$X_i' = X_{i-1} + L_0 \cos\theta_i$$

$$Y_i' = Y_{i-1} + L_0 \sin\Delta_1$$

In this situation, (a) road data is searched for a link (an element constituting a road) which is contained in a 200 m square area around the dead-reckoned vehicle position $P_i'$, to which a perpendicular having a length not greater than a predetermined distance (e.g., 100 m) can be drawn from the dead-reckoned vehicle position $P_i'$, and which is at an angle not greater than a certain value (e.g., 45°) from the dead-reckoned vehicle bearing $\theta_i$ at the dead-reckoned position $P_i'$. In this case, a link $LKa_1$ of a bearing $\theta a_1$ on the road RDa (straight line connecting nodes $Na_0$ and $Na_1$) and a link $LKb_1$ of a bearing $\theta b_1$ on a road RDb (straight line connecting nodes $Nb_0$ and $Nb_1$) are searched out as such a link. (b) Then the lengths of perpendiculars RLia and RLib drawn from the dead-reckoned vehicle position $P_i'$ to the links $LKa_1$ and $LKb_1$ are obtained. (c) Thereafter, a coefficient Z is calculated by the following equations:

$$Z = dL \cdot 20 + d\theta \cdot 20 \quad (d\theta \leq 35°) \qquad (4)$$

$$Z = dL \cdot 20 + d\theta \cdot 40 \quad (d\theta > 35°) \qquad (4)'$$

where dL is the length of the perpendicular drawn from the dead-reckoned vehicle position $P_i'$ to each link (the distance between the dead-reckoned vehicle position and the link) and $d\theta$ is the angle between the dead-reckoned vehicle bearing $\theta_i$ and the link. A larger weighting function is used when the angle $d\theta$ is large.

(d) After the coefficient value Z has been obtained, some of the links satisfying the following conditions 1, 2, and 3:

1. Distance $dL \leq 75$ m (=maximum absorbable distance),
2. Angle difference $d\theta \leq 30°$ (=maximum absorbable angle),
3. Coefficient value $Z \leq 1500$ are obtained and the link having the smallest coefficient value of the links satisfying these conditions, i.e., link $LKa_1$ in this case, is selected as a matching candidate (most probable road).

(e) Then a travel locus SHi connecting the points $P_{i-1}$ and $P_i'$ is translated in a direction along the perpendicular RLia until the point $P_{i-1}$ comes onto the link $LKa_1$ (or an extension of the link $LKa_1$) to obtain translated points $PT_{i-1}$ and $PT_i'$ of the points $P_{i-1}$ and $P_i'$. (f) Finally, the travel locus SHi is rotated on the point $PT_{i-1}$ until the point $PT_i'$ comes onto the link $LKa_1$ (or an extension of the link $LKa_1$) to obtain a moved point of the point PTi', which is selected as an actual vehicle position Pi ($X_i$, $Y_i$). The bearing $\theta_i$ is preserved as the vehicle heading at the actual vehicle position $P_i$. In case the point $P_{i-1}$ representing the preceding vehicle position is on the road RDa, the translated point $PT_{i-1}$ coincides with the point $P_{i-1}$, as shown in FIG. 20.

In map matching based on the projection method, however, once the dead-reckoned position of a vehicle traveling on a road is corrected to be a position on the wrong road (which may be a road extending generally parallel to the road on which the vehicle is traveling), the vehicle position dead-reckoned thereafter is also determined to be on the wrong road, even after the two roads are no longer parallel to one another. In this situation, the true vehicle position cannot be recognized, the vehicle position mark is displayed to indicate the position on the wrong road, and a guidance display and spoken guidance in accordance with the guided route cannot be output.

FIGS. 21A and 21B are diagrams explaining this problem of map matching processing based on the projection method described above. Referring to FIG. 21A, an express highway HW separates into two branch roads HW1 and HW2 at a branching point BP, and the branch roads HW1 and HW2 extend generally parallel to each other to a two-level crossing point CP and extend away from each other from crossing point CP so that the included angle therebetween gradually increases. Before the branching point BP is reached, the vehicle position represented by the vehicle position mark CM can be accurately corrected by being brought onto the line representing the express highway HW by map matching processing. However, when the vehicle moves onto the branch road HW2 from the branching point BP, there is a possibility of the vehicle position being erroneously corrected to be a position on the branch road HW1, as shown in FIG. 21B, because the crossing angle (included angle) between the branch roads HW1 and HW2 is small and because the branch roads HW1 and HW2 are generally parallel to each other. Once the vehicle position is corrected to be a position on the wrong road, the vehicle position, corrected each time a predetermined distance of e.g. 10 m is traveled, is thereafter maintained on the wrong road, so long as the correct and wrong roads are generally parallel with each other. After passing the two-level crossing point CP, the difference between the actual bearing of the vehicle and the direction of the branch road HW1 may become so large that one of the above-described conditions 1, 2 and 3 is not satisfied at a point Q, in other words, the road on which map matching is to be performed is "lost". Thereafter, the vehicle position mark may be displayed as deviating from the road.

In such a situation, the navigation apparatus is unable to recognize the correct vehicle position, resulting in failure to output a guidance display or spoken guidance in accordance with the guided route. Even for a navigation apparatus using both self-contained navigation and satellite navigation, the vehicle position cannot be corrected until a large distance has been traveled.

SUMMARY

In view of the above-described circumstances, in the present vehicle position correction method, even if the position of a vehicle recognized by the navigation apparatus is erroneously corrected to be a position on a road extending generally parallel to a road actually traveled by the vehicle after passing a branching point, the vehicle position recognized by the navigation apparatus is corrected to be the correct position on the actually-traveled road when the vehicle reaches a point at which the two roads are sufficiently spaced apart by being no longer parallel or when the angle therebetween is sufficiently large.

Also in the present vehicle position correction method, even if the position of a vehicle recognized by the navigation apparatus is erroneously corrected to be a position on a road extending generally parallel to a road actually traveled by the vehicle after passing a branching point, the vehicle position recognized by the navigation apparatus is corrected to be the correct position on the actually-traveled road, before the distance between the actual vehicle position and the vehicle position recognized by the navigation apparatus becomes large.

To achieve this, according to one aspect of the present invention, vehicle position correction includes observing whether the vehicle has passed a point at which the road traveled by the vehicle diverges into two or more branch roads, obtaining a most probable candidate road and a candidate road different from the most probable candidate road and satisfying predetermined conditions by map matching processing after passing the point, correcting a dead-reckoned vehicle position to be a position on the most probable candidate road to regard the corrected position as an actual vehicle position, and correcting the dead-reckoned vehicle position to be a position on the other candidate road to set the corrected position as a temporary vehicle position, executing map matching processing based on the actual vehicle position each time the predetermined distance is traveled, executing map matching processing based on the temporary vehicle position, and continuing map matching processing by setting the temporary vehicle position as the actual vehicle position, when the map matching processing based on the actual vehicle position finds no road on which map matching is to be performed.

According to this, even if after passing a branching point the vehicle position is erroneously corrected to be a position on a road extending generally parallel to the road on which the vehicle is actually traveling, the vehicle position recognized by the navigation apparatus can be corrected to the correct vehicle position on the actually-traveled road when the vehicle reaches a point at which the two roads are sufficiently spaced apart by being no longer parallel or when the angle therebetween is sufficiently large. Also, the vehicle position recognized by the navigation apparatus is corrected to be the correct position on the actually-traveled road, before the distance between the actual vehicle position and the vehicle position recognized by the navigation apparatus becomes large.

In map matching processing based on a projection method, the vehicle position is dead-reckoned using a self-contained navigation sensor each time the vehicle travels a predetermined distance, a most probable candidate road satisfying predetermined conditions is obtained using the dead-reckoned vehicle position, and the vehicle position is corrected to a position on the most probable candidate road. In this processing, it is determined that a road satisfies the predetermined condition if the road is at a distance from the dead-reckoned vehicle position equal to or less than a predetermined value and at an angle from the vehicle bearing at the dead-reckoned position equal to or less than a predetermined value, and if the coefficient value calculated by using the distance dL from the dead-reckoned vehicle position to the road and the angle dθ between the vehicle bearing and the direction of the road at the dead-reckoned vehicle position is equal to or less than a predetermined value. The road having the smallest coefficient value is set as the most probable candidate road, and the road having the next smallest coefficient value is set as the next-precedence candidate road. This map matching enables the vehicle position to be corrected to be on the most probable road. Moreover, even if the vehicle position is erroneously corrected by assuming that a road generally parallel to the road on which the vehicle is actually traveling after passing a branching point is a most probable road, and that the road actually traveled is a next-precedence road, the vehicle position recognized by the navigation apparatus is corrected to be the correct position on the actually-traveled road (next-precedence road) when the vehicle reaches a point at which the two roads are sufficiently spaced apart by reducing the degree of parallelism therebetween.

Also, the first map matching processing based on the actual vehicle position and the second map matching processing based on the temporary vehicle position are executed in parallel with each other only when the angle between branch roads at a branching point is equal to or less than a predetermined value. Therefore, when the vehicle passes a branching point of branch roads having a large crossing angle, it is not necessary to perform the two map matching processing operations in parallel with each other, so that the load on the processor of the navigation apparatus is reduced.

Also, the second map matching processing based on the temporary vehicle position stops 1) when the distance between the actual vehicle position and the temporary vehicle position observed becomes equal to or greater than a set value, 2) when the map matching processing based on the temporary vehicle position is such that no candidate road is found as a road satisfying the predetermined condition, or 3) when the distance traveled from the branching point becomes equal to or greater than a predetermined value. If one of the conditions 1, 2, and 3 is satisfied, it is possible to determine that the vehicle position is corrected to be on the correct road by the first map matching processing. In this case, the second map matching processing stops, to reduce the load on the navigation apparatus processor.

BRIEF DESCRIPTION OF THE DRAWINGS

FIG. 2 is a diagram showing the structure of road data which is part of the map data;

FIG. 16 is a table showing spoken guidance;

FIGS. 21A and 21B are diagrams explaining a problem with map matching processing based on the projection method.

DETAILED DESCRIPTION

Navigation System

1. System Configuration

Figure 1:
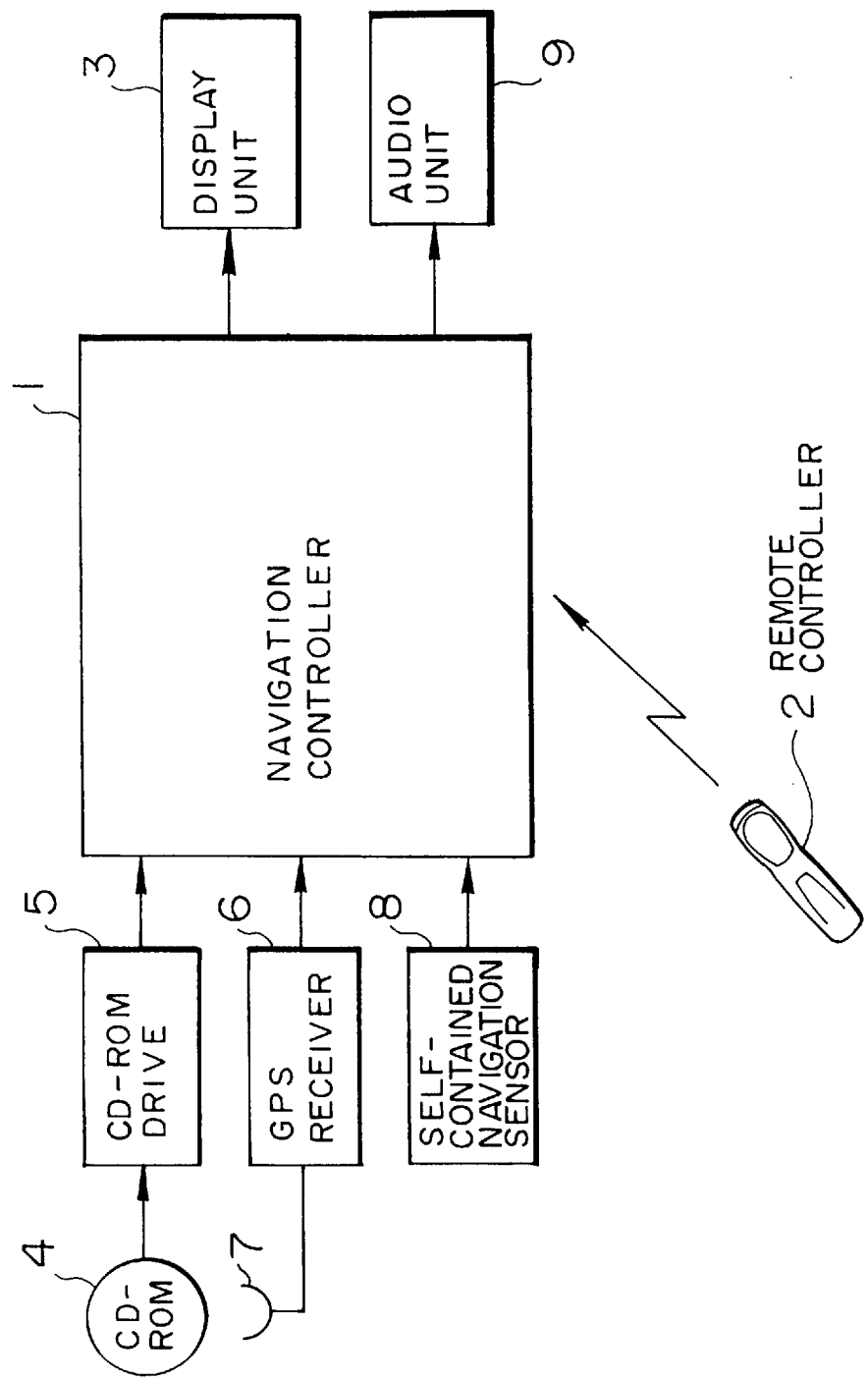
FIG. 1 is a diagram of the present navigation system.

FIG. 1 shows a navigation system including a navigation controller 1, an operating unit (e.g., a remote controller) 2 for inputting various instructions to the navigation controller, setting a guide route and setting various kinds of data, and a display unit 3 for displaying a map, a guide route, an intersection guidance diagram, various menus, and the like. The navigation system also includes a compact disk read only memory (CD-ROM) 4 (storing a map data base) in which map information is stored, a CD-ROM drive 5, a GPS receiver 6 for receiving radio signals from satellites to measure the present position and bearing of the vehicle, a multiple beam antenna 7 for receiving radio signals from each satellite, a sensor 8 for self-contained navigation, and an audio unit 9 for outputting spoken guidance at an intersection. The audio unit 9 may be adapted for use with an ordinary car audio system.

The GPS receiver 6 calculates the position and bearing of the navigated vehicle by three-dimensional or two dimensional position-measuring processing (the bearing being obtained as a line connecting the present vehicle position and the vehicle position measured one sampling time ΔT before), and outputs the calculated position and bearing along with the position-measuring time. The self-contained navigation sensor 8 includes different kinds of sensors, described below with reference to FIG. 4.

The map information stored in the CD-ROM 4 includes (1) a road layer, (2) a background layer for displaying objects on a map, (3) a character layer for displaying names of cities, towns, villages and the like, (4) an integrated information service (IIS) layer for storing IIS information. Of these layers, the road layer has, as shown in FIG. 2, road link data RLDT, node data NDDT and crossing data CRDT.

Road link data RLDT is provided as information on attributes of roads and includes a total number of nodes in a road, the numbers of nodes forming each road, road numbers (road names) and the kinds of road (national road, expressway, prefectural road and so on).

Crossing data CRDT is a set of nodes closest to each intersection on a map (intersection forming nodes) in the nodes of links connecting to the intersection. Node data NDDT is a list of all nodes forming each road and has, with respect to each node, position information (longitude, latitude), an intersection discrimination flag for indicating whether the node corresponds to an intersection, and a pointer which designates intersection data if the node corresponds to an intersection or designates the road link to which the node belongs if the node corresponds to no intersection.

2. Remote Controller

Figure 3:
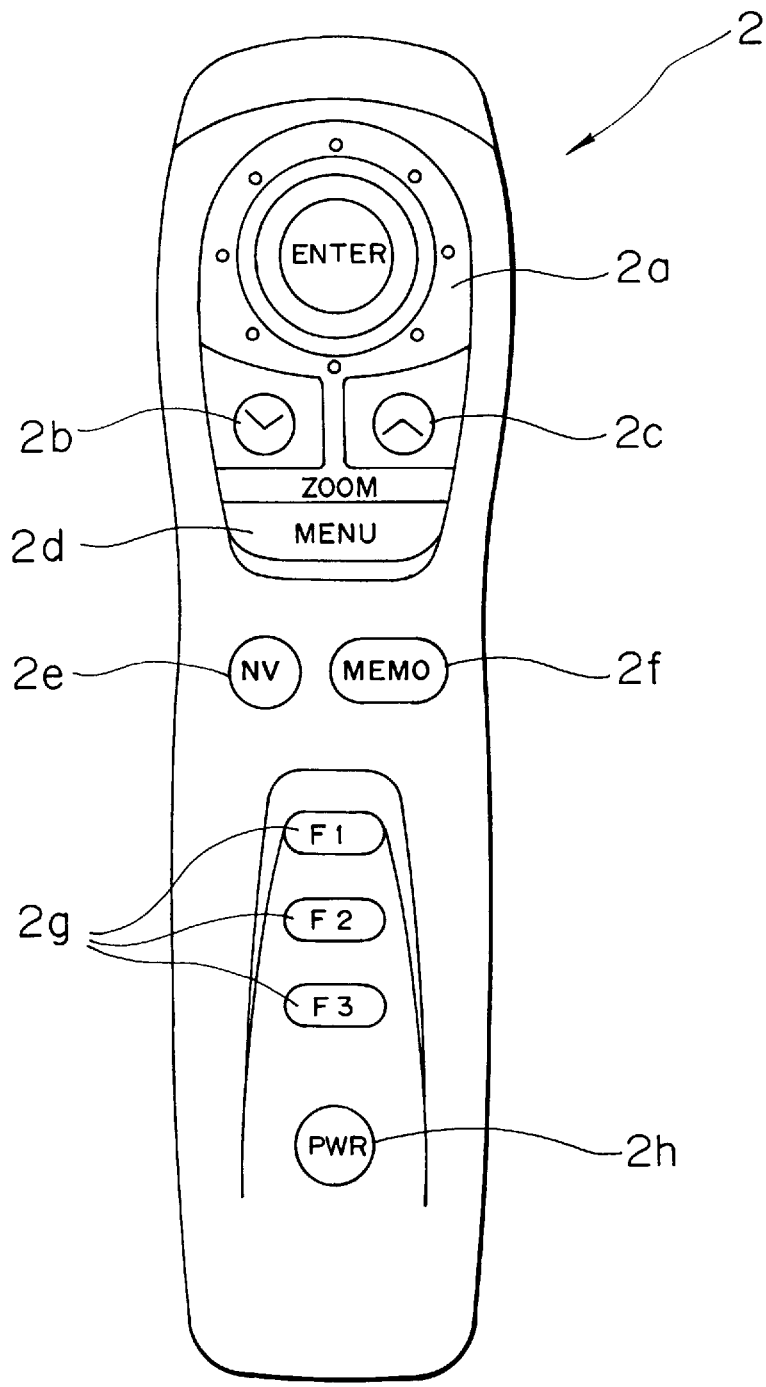
FIG. 3 is a diagram of the present remote controller.

FIG. 3 shows the remote controller having various keys. Joystick key 2a moves a cursor (focus), a user's vehicle mark or the like in eight directions relative to a map or to select a desired menu item by moving a menu selecting bar in vertical and horizontal directions, and is depressed when a menu is selected. Enlargement key 2b displays a map on such a comparatively large scale as to show details thereof. Reduction key 2c displays a wide-area map. Menu key 2d displays a menu. Navigation (NV) key 2e displays a map containing a point corresponding to the user's vehicle position along with the user's vehicle mark. Memory (MEMO) key 2f stores a desired point. Functions frequently used are set in combination with function keys 2g and are each selected by operating the corresponding one of function keys 2g. Key 2h is the power key.

Navigation Controller

Figure 4:
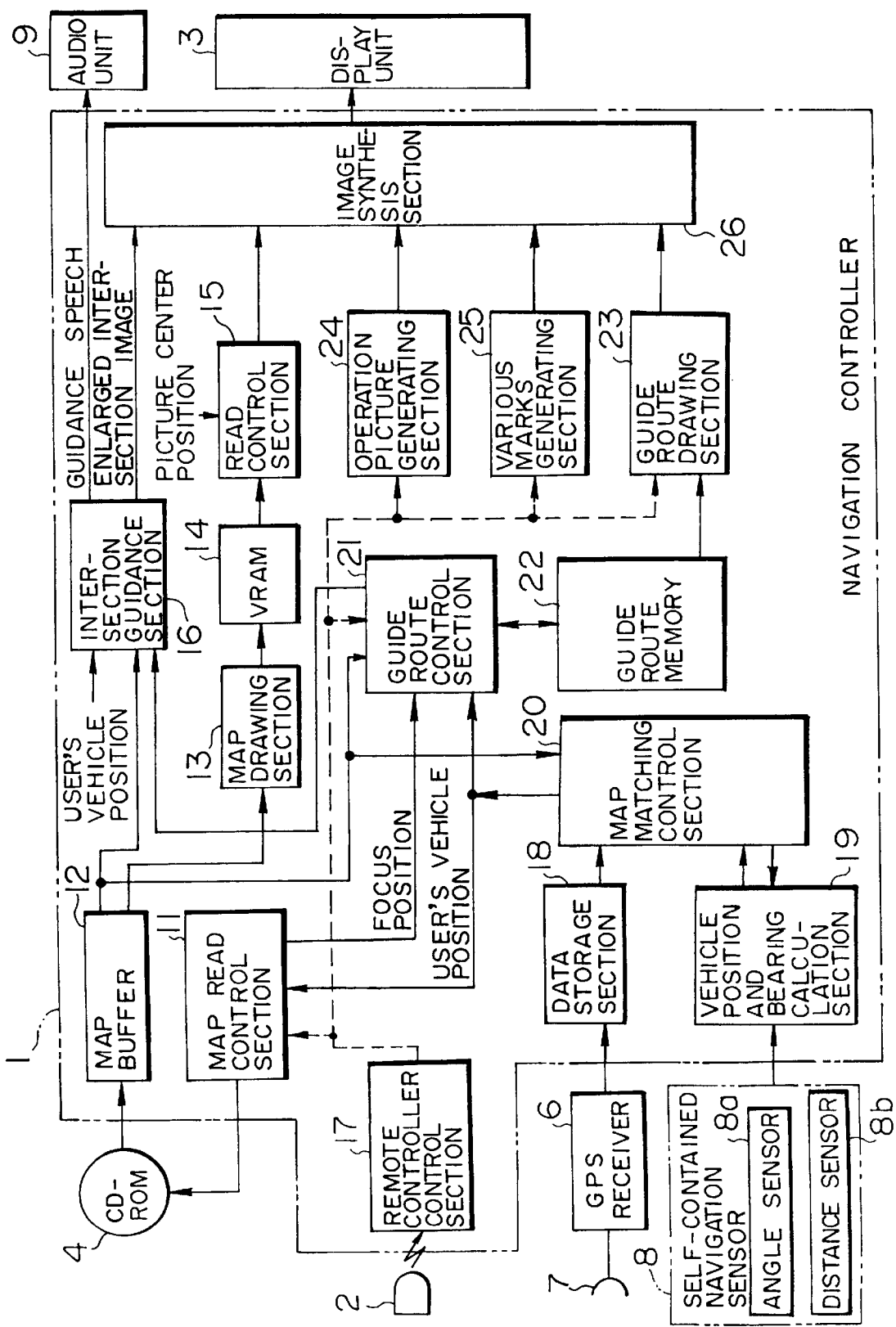
FIG. 4 is a detailed diagram of the present navigation apparatus.

FIG. 4 shows the navigation controller 1 along with the remote controller 2, the display unit 3, the CD-ROM 4 in which map information is stored, and the CD-ROM drive 5, the GPS receiver 6, the multiple beam antenna 7, the self-contained navigation sensor 8 and the audio unit 9. The self-contained navigation sensor 8 includes a relative direction sensor (angle sensor) 8a such as a gyrocompass for detecting the angle of rotation of the vehicle, and a distance sensor 8b which generates one pulse each time a predetermined distance is traveled.

The navigation controller 1 has a map reading control section 11 for 1) calculating a focus position (picture center longitude and latitude) when the operation of moving a map or selecting a map area by the joystick key, the reduction key, the enlargement key or the like, and 2) reading predetermined map information from the CD-ROM 4 on the basis of the vehicle position, the focus position or the like. Map buffer 12 stores map information read out from the CD-ROM. Map information of a plurality of pages (units), e.g., 3×3 units of map information surrounding the vehicle position or the focus position, is read to the map buffer 12 to enable map scrolling as described below. Map drawing section 13 generates a map image by using map information stored in the map buffer 12. Video random access memory (VRAM) 14 stores the map image. Read control section 15 displays a map while scrolling the same according to the movement of the vehicle position or focus movement by changing the position of one picture cut out from the VRAM 14 on the basis of the picture center position (vehicle position, focus position).

Intersection guidance section 16 performs guidance at an approached intersection by using a displayed image and speech. During actual navigation along a guide route, when the vehicle moves within a predetermined range of an intersection approached by the vehicle, the intersection guidance section 16 displays diagrams for guidance at the intersection (an enlarged intersection diagram, a destination, an arrow indicating a direction in which the vehicle is to move) on a display screen and also performs spoken guidance designating the direction in which the vehicle is to move.

Remote controller control section 17 receives a signal according to an operation of the remote controller 2 and sends commands to related sections according to the signal. GPS data storage section 18 stores GPS data supplied from the GPS receiver 6. Vehicle position and bearing calculation section 19 calculates the vehicle position (dead-reckoned vehicle position) and a vehicle bearing on the basis of an output from the self-contained navigation sensor. Map matching control section 20 functions as described below.

First, the map matching control section 20 has an essential function of correcting the vehicle position to a position on a road traveled by the vehicle, by performing map matching processing using map information read to the map buffer 12 and the vehicle position and bearing dead-reckoned each time a predetermined distance (e.g. 10 m) is traveled. In self-contained navigation, as the vehicle travels on a road, errors in determining the vehicle position accumulate such that the recognized vehicle position deviates from the traveled road. The map matching control section 20, therefore, corrects the dead-reckoned vehicle position to a position on the traveled road. Also, if in self-contained navigation the amount of error becomes so large that the vehicle position deviates substantially from the traveled road so the vehicle position cannot be corrected to be the present position on the actually-traveled road by map matching, then the map matching control section 20 corrects the vehicle position and the vehicle bearing as determined by the self contained navigation by using position data (GPS position) and bearing data (GPS bearing) obtained from the GPS. That is, the map matching control section 20 calculates the distance D between the GPS position and the self-contained navigation position, compares the distance D with a present distance threshold value Dth (e.g., 150 m) and corrects vehicle position to the position measured by the GPS if the distance D exceeds Dth, and sets the vehicle position mark on the road by map matching thereafter performed.

Second, the map matching control section 20 corrects an incorrect vehicle position recognized by the navigation apparatus where the vehicle position recognized is erroneously corrected to be a position on a road extending generally parallel to a road on which the vehicle is actually traveling after passing a branching point. That is, the erroneous vehicle position recognized by the navigation apparatus is corrected to be the actual position on the correct road when the parallelism between the two roads is lost or when the difference between the directions of the two roads becomes large, as described below.

Figure 5:
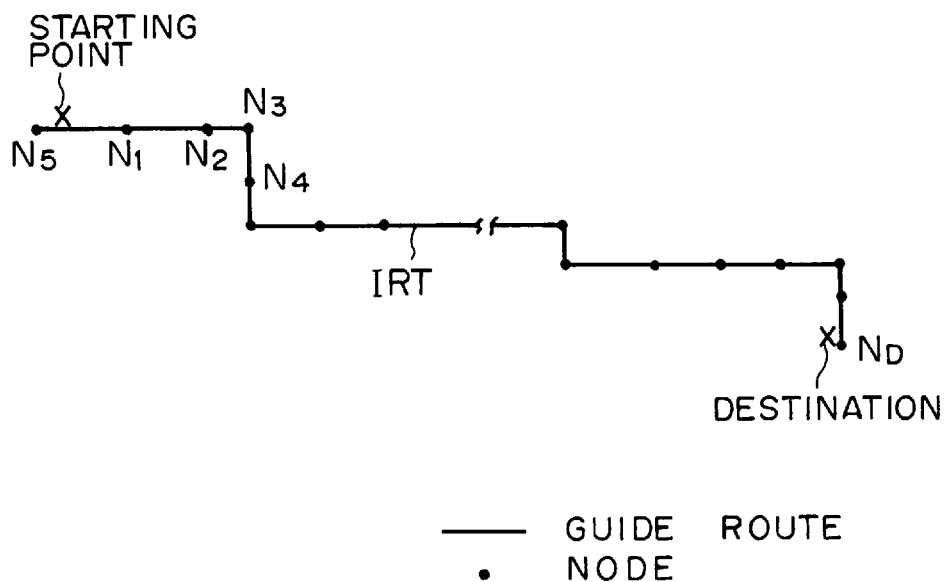
FIG. 5 is a diagram of a series of nodes defining a guided route.
Figure 6:
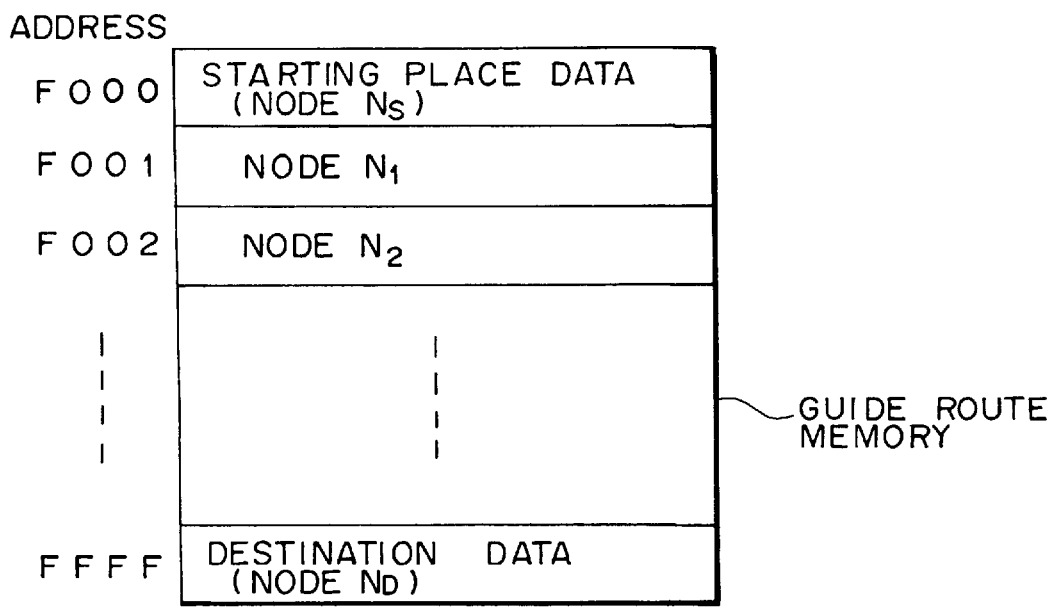
FIG. 6 is a diagram showing guided route data stored in a guided route memory.

Guide route control section 21 determines a guided route to selected destination and performs recalculation of the guided route from the present vehicle position to the destination. Guided route memory 22 stores a guided route. Guided route drawing section 23 draws the guided route stored in the guided route memory 22. The guided route memory 22 stores data on the positions of all nodes $N_s$, $N_i$ (i=1,2, . . .), $N_D$ on a guided route IRT (see FIG. 5) from a starting point to a destination calculated by the guided route control section 21, as shown in FIG. 6. When a map picture is displayed, the guided route drawing section 23 reads out guided route information (node series) from the guided route memory 22 and draws the corresponding guided route on the map.

Operation picture generating section 24 displays various menu pictures (operation pictures). Mark generating section 25 outputs various marks including the vehicle mark and the cursor at the time of map picture display. Section 26 is an image synthesis section.

It is to be understood that controller 1 typically includes a microprocessor or microcontroller executing a computer program (instructions) stored in a computer-readable memory (medium) associated with the microprocessor/microcontroller. Certain blocks of controller 1 represent other electronic components; e.g. VRAM 14, data storage section 18, and guide route memory 22 are memory. The computer program (a computer process) is described in further detail below; coding such a program is well within the skill of one of ordinary skill in the art in light of this disclosure.

Map Matching Control Section

1. Configuration

Figure 7:
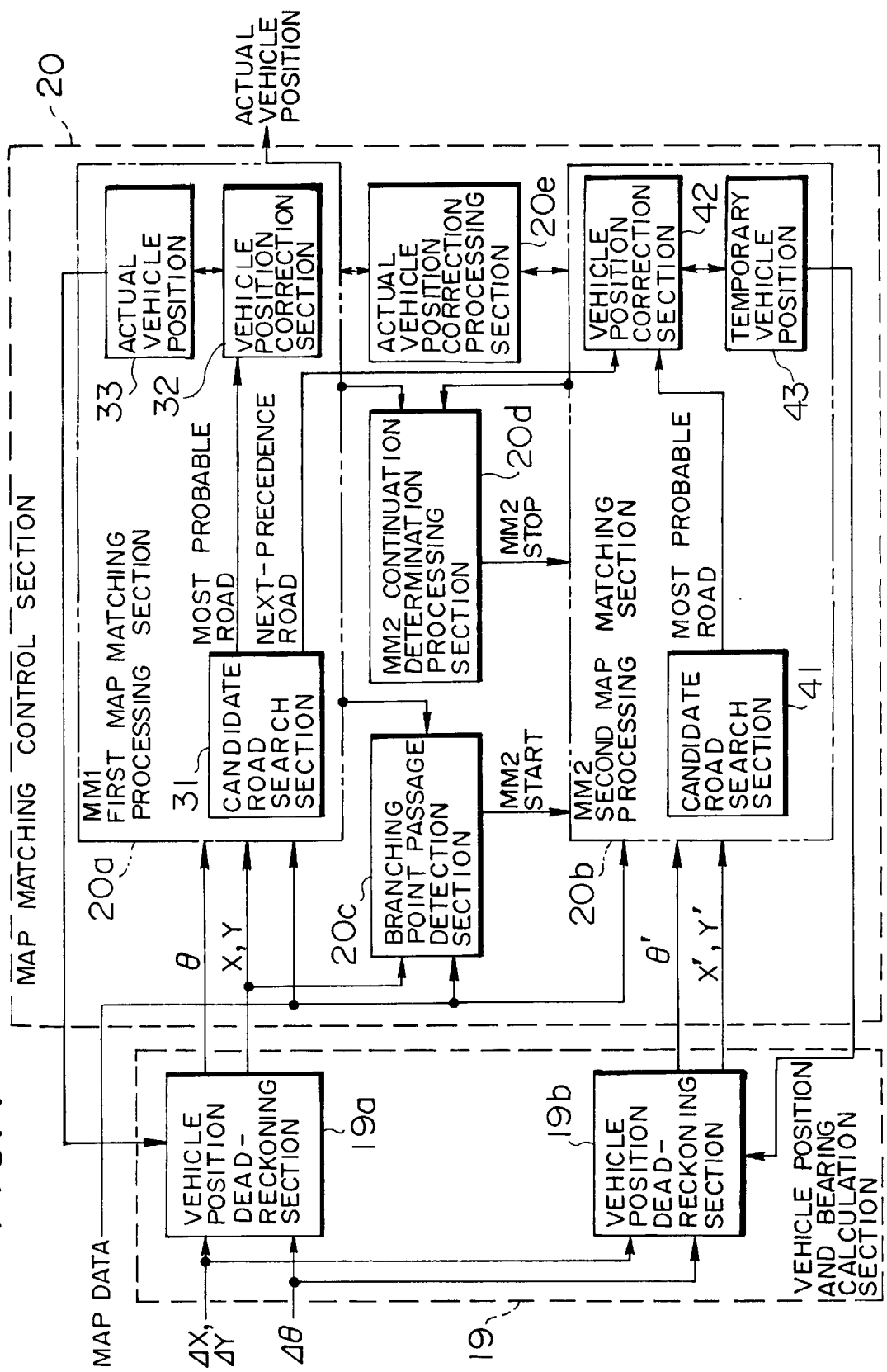
FIG. 7 is a diagram of the configuration of a map matching control section.

FIG. 7 shows the vehicle position and bearing calculation section 19 and the map matching control section 20. The vehicle position and bearing calculation section 19 includes main and sub (first and second) vehicle position dead-reckoning sections 19a and 19b for calculating coordinates (e.g. latitude and longitudinal) X, Y; X', Y' of the dead-reckoned position and vehicle bearings θ, θ' by above equations (1) to (3).

The map matching control section 20 includes a first map matching processing section 20a for performing main map matching processing (MM1) based on the well known projection method, and a second map matching processing section 20b for performing sub map matching processing (MM2) based on the projection method.

Ordinarily, the dead-reckoned vehicle position calculated by the vehicle position dead-reckoning section 19 is corrected to a position on the traveled road by map matching processing (MM1) performed by the first map matching processing section 20a. However, if after passing a branching point there is a different road generally parallel to the road actually traveled (see FIG. 21A), first map matching processing MM1 and second map matching processing MM2 are executed in parallel with each other. That is, the first map matching processing section 20a executes first map matching processing MM1 such that the dead-reckoned vehicle position is corrected to a position on a most probable candidate road obtained by map matching processing (MM1) immediately after passing the branching point, the corrected position being regarded as representing the actual vehicle position. On the other hand, the second map matching processing section 20b executes second map matching processing MM2 such that the dead-reckoned vehicle position is corrected to a position on a next-precedence probable candidate road obtained by map matching processing (MM1) immediately after passing the branching point, the corrected position being set as a temporary vehicle position. These first and second map matching processing operations MM1 and MM2 are continued until one of the predetermined conditions described below is satisfied.

The map matching control section 20 also includes a branching point passage detection section 20c for detecting the vehicle passing a branching point, a MM2 continuation determination section 20d for determining whether second map matching processing (MM2) is to continue or to stop, and an actual vehicle position correction processing section 20e which sets a temporary vehicle position obtained by the second map matching processing as a position representing the actual vehicle position, when the predetermined condition described below is satisfied.

The first map matching processing section 20a includes a candidate road search section 31 for searching for a candidate road on which map matching is to be performed, a vehicle position correction section 32 for correcting the dead-reckoned vehicle position obtained by the vehicle position dead-reckoning section 19a to a position on a most probable candidate road, and an actual vehicle position storage section 33 for storing the corrected vehicle position as the actual vehicle position. The second map matching processing section 20b has a candidate road search section 41 for searching for a candidate road on which map matching is to be performed, a vehicle position correction section 42 for correcting the dead-reckoned vehicle position obtained by the vehicle position dead-reckoning section 19b to a position on a next-precedence candidate road, and a temporary vehicle position storage section 43 for storing the corrected vehicle position as a temporary vehicle position.

2. Candidate Road Search Processing

Each of the candidate road search sections 31 and 41 searches for links defined 1) by being contained in a 200 m square area surrounding the dead-reckoned vehicle position, 2) by having thereon a perpendicular drawn from the dead-reckoned position, 3) by being at an angle not greater than a predetermined value (e.g., 45°) from the vehicle bearing at the dead-reckoned position, and 4) by limiting the length of the perpendicular drawn from the dead-reckoned vehicle position to a value not greater than a predetermined distance (e.g., 100 m).

Then the following equations:

$$Z = dL \cdot 20 + d\theta \cdot 20 \quad (d\theta \leq 35°) \quad (4)$$

$$Z = dL \cdot 20 + d\theta \cdot 40 \quad (d\theta > 35°) \quad (4)'$$

are calculated to determine a coefficient Z with respect to each of links searched out. In these equations, dL is the length of the perpendicular drawn from the dead-reckoned vehicle position to the link (the distance between the dead-reckoned vehicle position and the link) and $d\theta$ is the angle between the dead-reckoned vehicle bearing $\theta_i$ and the link.

A larger weighting coefficient is used with respect to a larger value of the angle $d\theta$. After the coefficient value Z of each link has been calculated, some of the links satisfying (1) distance $dL \leq 75$ m (=maximum absorbable distance), (2) angle difference $d\theta \leq 30°$(=maximum absorbable angle), and (3) coefficient value $Z \leq 1500$ are obtained, the link having the smallest coefficient value in the links satisfying these conditions is determined to be a most probable road and one having the next-smallest coefficient value is a next-precedence candidate road.

3. Branching Point Passing Detection Processing

Figure 8:
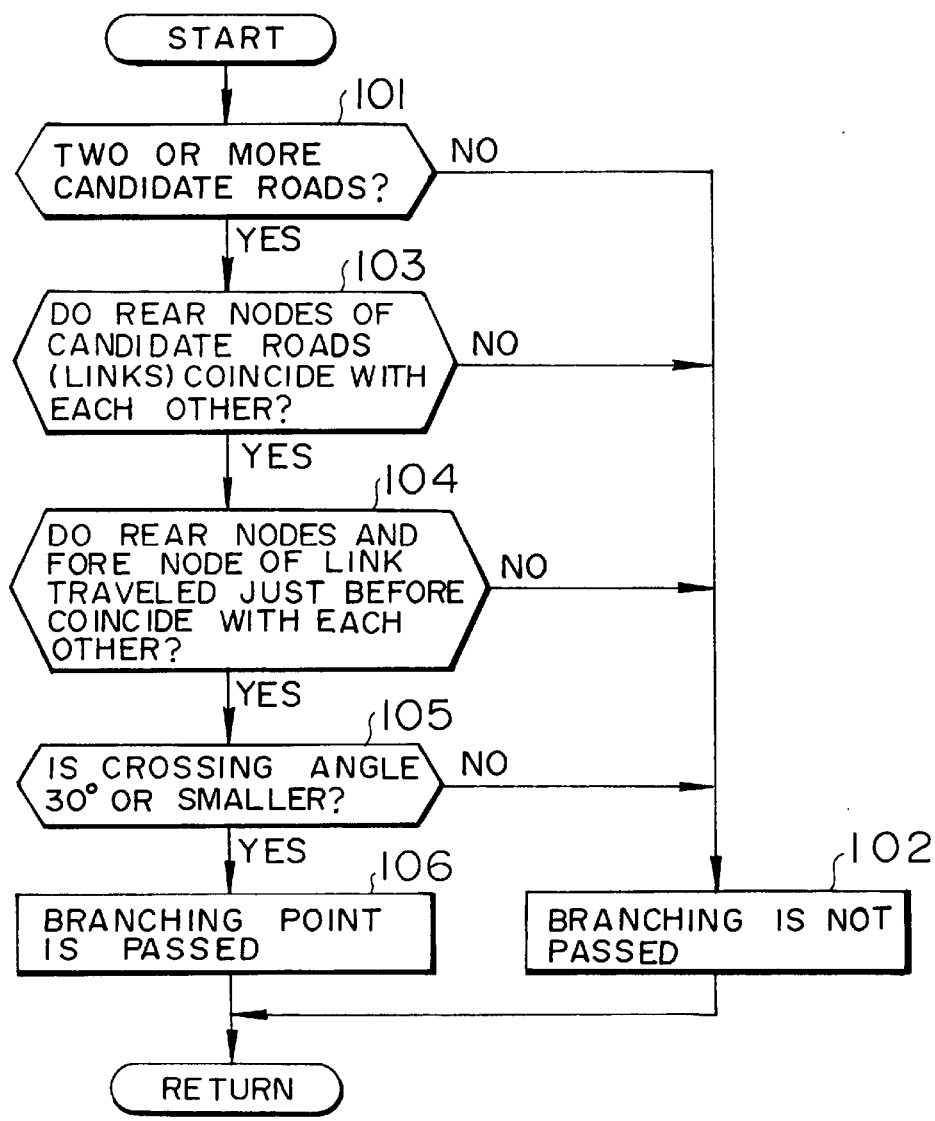
FIG. 8 is a flow chart of branching point passage recognition processing.
Figure 9:
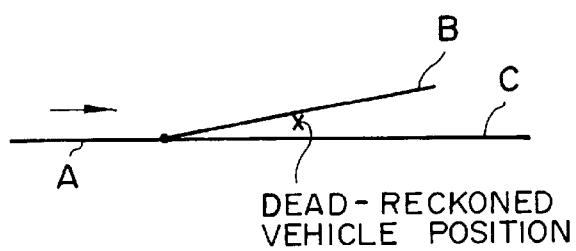
FIG. 9 is a diagram explaining passing a branching point.

FIG. 8 is a flow chart of branching point passing detection processing and FIG. 9 is a diagram explaining passage point detection processing. The branching point passing detection section 20c determines whether there are two or more candidate roads as a result of map matching in the first map matching processing section 20a (Step 101), and determines that no branching point has been passed if there is only one candidate road (Step 102). On the other hand, if there are two or more candidate roads (links B, C) as shown in FIG. 9, the branching point passing detection section 20c determines as to whether rear nodes of the links B and C coincide with each other by referring to the map data (Step 103). If the rear nodes do not coincide with each other, the branching point passing detection section 20c determines that no branching point has been passed (Step 102). If the rear nodes coincide with each other, and if the rear nodes and fore node of the link traveled just before do not coincide with each other, the branching point passage detection section 20c determines that no branching point has been passed. If the rear nodes coincide with each other and the rear nodes and fore node of the link traveled just before coincide with each other, the branching point passing detection section 20c obtains the crossing angle between the candidate roads B and C and determines as to whether the crossing angle is not greater than 30° (Step 105). The branching point passing detection section 20c determines that no branching point has been passed if the crossing angle is greater than 30°, and determines that a branching point has been passed if the crossing angle is not greater than 30° (Step 106). That is, even if the traveled road diverges into two or more roads at a point, this point is not regarded as a branching point if the crossing angle is greater than 30°; hence a branching point is recognized only when the crossing angle is not greater than 30°.

4. MM2 Continuation Determination Processing

After passing a branching point, the second map matching processing section 20b executes map matching processing (MM2) by assming that the vehicle is traveling on a next-precedence candidate road obtained by map matching processing (MM1) immediately after passing the branching point. This is because it is possible that the vehicle is actually traveling not on a most probable road obtained by map matching after passing the branching point but on the next-precedence candidate road. In such a case, the first map matching (MM1) performed by assuming that the vehicle is traveling on the most probable road will "lose" the candidate road on which map matching is to be performed. Then the temporary vehicle position obtained by the second map matching processing (MM2) is set as a position representing the actual vehicle position. However, the second map matching processing (MM2) is useless and only increases the load on the system processor if the vehicle is actually traveling on the most probable road determined by the map matching processing (MM1) immediately after passing the branching point.

Therefore, the MM2 continuation determination processing section 20d determines whether each of conditions 1, 2, 3, and 4 shown below is satisfied, and stops the map matching processing (MM2) performed by the second map matching processing section 20b if at least one of these conditions is satisfied. That is, the MM2 continuation determination processing section 20d stops the second map matching processing:

1) when, while the road on which map matching is to be performed by the first map matching processing is being recognized, the distance traveled from the branching point becomes equal to or greater than a set (predetermined) distance, e.g. 2000 m,
2) when, while a road on which map matching is to be performed by the first map matching processing is being recognized, the distance between the actual vehicle position obtained by the first map matching processing (MM1) and the temporary vehicle position obtained by the second map matching processing (MM2) becomes equal to or greater than a predetermined distance, e.g. 300 m,
3) when the candidate road on which map matching is to be performed by the second map matching processing (MM2) is lost, or
4) when the coefficient value Z of the most probable road obtained by equation (4) or (4)' in the second map matching processing (MM2) becomes equal to or greater than 1600.

If none of these conditions is satisfied, the MM2 continuation determination processing section 20d allows the second map matching processing to continue.

If one of the conditions 1 and 2 is satisfied, that is, the road on which map matching is to be performed by the first map matching (MM1) is still being recognized even after traveling through such a distance, it is possible to determine that the vehicle is actually travelling on the most probable road after passing the branching point. If one of the conditions 3 and 4 is satisfied, it is possible to determine that the vehicle is not actually travelling on the next-precedence candidate road.

5. Processing for Setting Temporary Vehicle Position as Corrected Actual Vehicle Position The first map matching processing (MM1) is performed supposing that the vehicle is traveling on the most probable road obtained by the map matching processing (MM1) immediately after passage through the branching point. However, there is a possibility of the vehicle not actually traveling on the most probable road. In such a case, there is a need to set as a corrected recognized actual vehicle position the temporary vehicle position obtained by the second map matching processing performed in parallel with the first map matching processing.

The actual vehicle position correction section 20e determines that the vehicle is traveling not on the most probable road obtained by the map matching processing (MM1) after passing the branching point but on the next precedence road (another branch road)

1) when a situation occurs where no candidate road can be obtained by the first map matching processing (MM1), or
2) when a situation occurs where a continuity of calculation results of the first map matching processing (MM1) cannot be maintained. In this case, the actual vehicle position correction section 20e sets as a corrected actual vehicle position the temporary vehicle position obtained by the second map matching processing.

Overall Position Correction Operation

Figure 10:
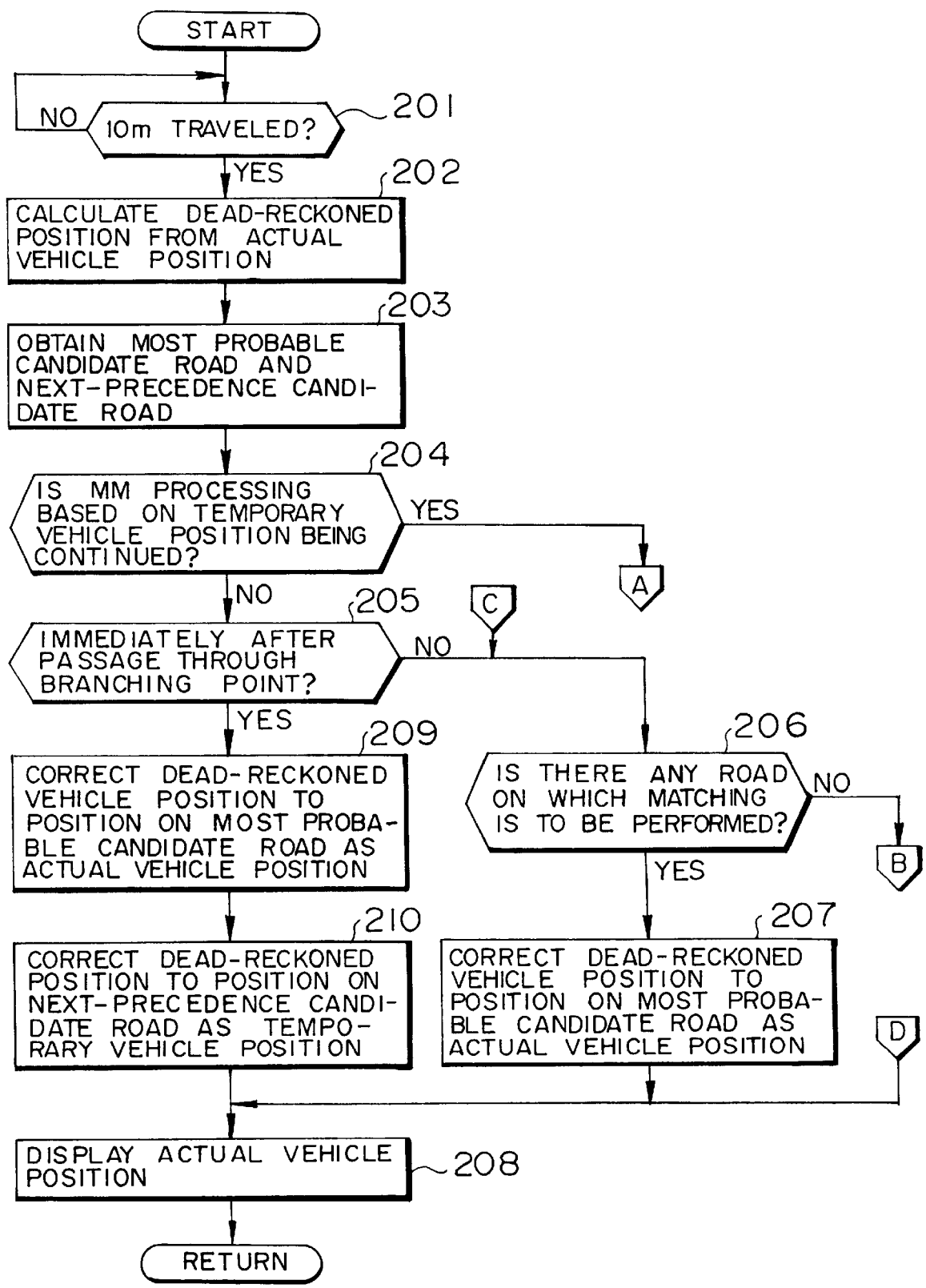
FIG. 10 is a flow chart of position correction processing in accordance with the present invention (Part 1)
Figure 11:
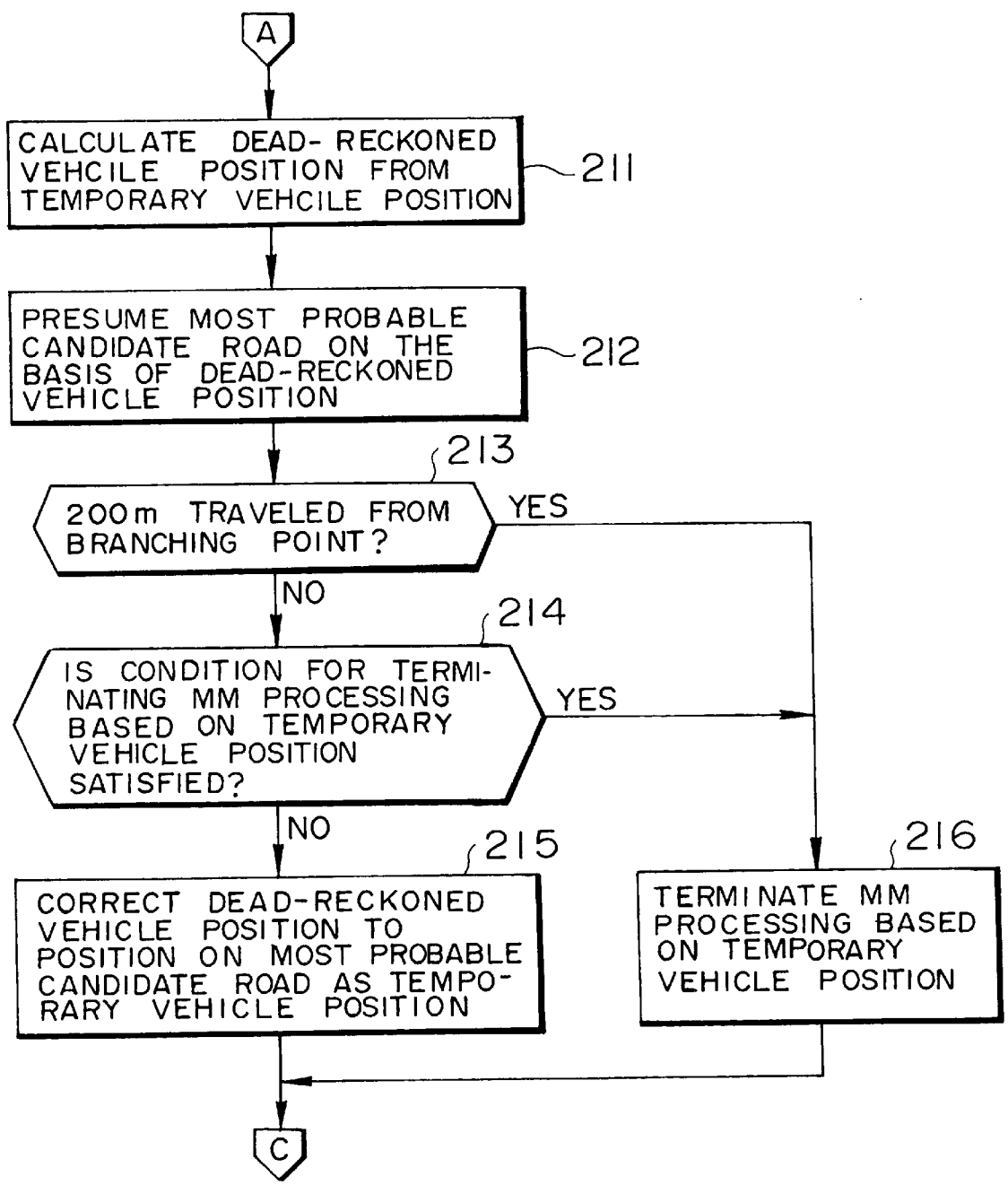
FIG. 11 is a flow chart of position correction processing in accordance with the present invention (Part 2)
Figure 12:
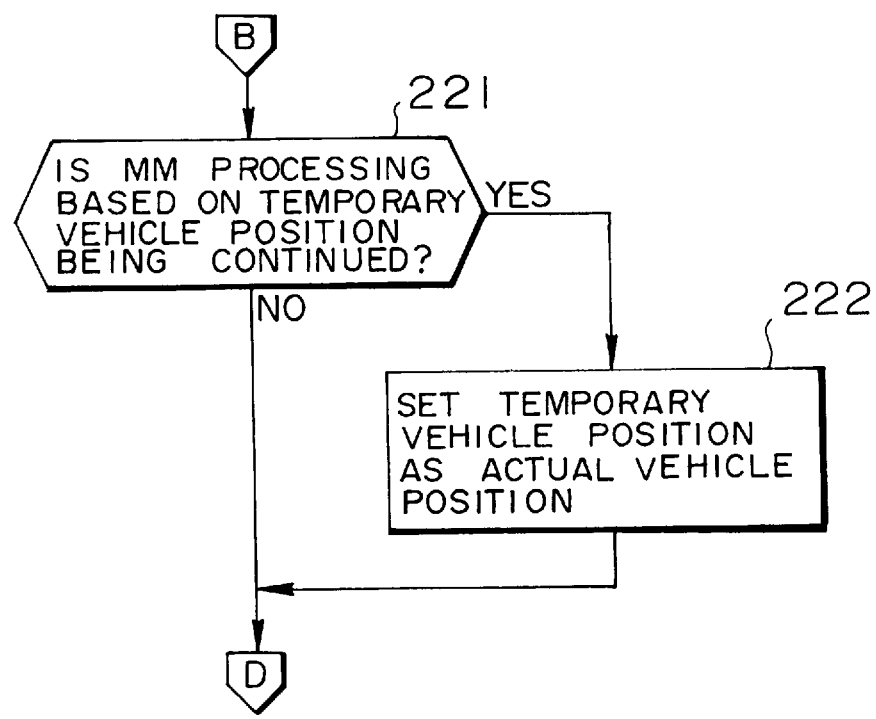
FIG. 12 is a flow chart of position correction processing in accordance with the present invention (Part 3)

FIGS. 10 to 12 are flow charts of the overall position correction processing performed by the vehicle position and bearing calculation section 19 and the map matching control section 20.

Each time the vehicle travels a predetermined distance, e.g. 10 m, the first vehicle position dead-reckoning section 19a calculates vehicle position X- and Y-coordinates and vehicle bearing $\theta$ by equations (1) to (3) and by using the actual vehicle position (before traveling the 10 m distance) stored in the actual vehicle position storage section 33 (Steps 201, 202). The first map matching processing section 20a executes map matching processing based on the projection method using the map data and the dead-reckoned vehicle position coordinates X and Y and vehicle bearing $\theta$ to obtain candidate roads (most probable road, next-precedence candidate road) (Step 203).

Next, a determination is made as to whether the second map matching MM2 executed after passing a branching point (map matching processing on the basis of a temporary vehicle position) has been started (Step 204). If the second map matching processing MM2 has not been started, a check is made as to whether the present time is immediately after passing a branching point (Step 205). If not immediately after passing a branching point, a check is made as to whether there is any road on which map matching is to be performed (Step 206). If such a road exists, the dead-reckoned position is corrected to a position on a most probable road as a position representing the actual vehicle position (Step 207). Then the vehicle position mark is displayed on the traveled road on the map (Step 208). The process thereafter returns to continue processing from the start.

Thus, before a branching point is passed, the above-described processing flow is performed.

If it is determined in Step 205 that a branching point has passed, the first map matching processing section 20a corrects the dead-reckoned vehicle position to a position on the most probable road obtained in Step 203, the corrected position being recognized as the actual vehicle position (Step 209), and the second map matching processing section 20b corrects the dead-reckoned vehicle position to a position on the next-precedence candidate road as a temporary vehicle position (Step 210).

Thereafter, the vehicle position mark is displayed on the traveled road on the map on the basis of the actual vehicle position (Step 208). The process then returns to continue processing from the start. That is, each time the vehicle travels a predetermined distance, e.g. 10 m, the first vehicle position dead-reckoning section 19a calculates vehicle position X- and Y-coordinates and vehicle bearing $\theta$ by equations (1) to (3) and by using the actual vehicle position (before traveling the 10 m) stored in the actual vehicle position storage section 33 (Steps 201, 202). The first map matching processing section 20a executes map matching processing based on the projection method using the map data and the dead-reckoned vehicle position coordinates X and Y and vehicle bearing $\theta$ to obtain candidate roads (most probable road, next-precedence candidate road) (Step 203), and thereafter determines whether the second map matching MM2 executed after passage through a branching point (map matching processing on the basis of a temporary vehicle position) has been started (Step 204).

If the second map matching processing MM2 has been started, the second vehicle position dead-reckoning section 19b calculates vehicle position X'- and Y'-coordinates and vehicle bearing $\theta'$ by equations (1) to (3) and by using the temporary vehicle position (before traveling the 10 m) stored in the temporary vehicle position storage section 43 (Steps 211, 212). Then the MM2 continuation determination processing section 20d determines as to whether the distance traveled from the branching point becomes equal to or greater than a predetermined (set) distance, e.g. 2000 m (Step 213), or whether the condition for terminating the second map matching processing MM2 is satisfied, that is, (1) whether the distance between the actual vehicle position obtained by the first map matching processing (MM1) and the temporary vehicle position obtained by the second map matching processing (MM2) becomes equal to or greater than a predetermined distance, e.g., 300 m, (2) whether the candidate road on which map matching is to be performed by the second map matching processing (MM2) is lost, or whether the coefficient value Z of the most probable road becomes equal to or greater than 1600 (Steps 213, 214).

If each of the conditions of Steps 213 and 214 is not satisfied, the dead-reckoned vehicle position is corrected to be a position on the most probable road obtained by the second map matching MM2 to be stored as a temporary vehicle position in the storage 43 (Step 215). Thereafter, by the processing in Steps 205 to 208, the vehicle position is corrected to be a position on the most probable road after passing the branching point, and the vehicle position mark is displayed on the most probable road on the map.

In the processing after passing the branching point, if one of the conditions in Steps 213 and 214 is satisfied, in other words, if the vehicle is actually traveling on the most probable road obtained after passing the branching point, the MM2 continuation determination processing section 20*d* instructs the second map matching processing section 20*b* to stop the second map matching processing MM2. The second map matching processing based on the temporary vehicle position is thereby terminated (Step 216). Subsequently, only the first map matching processing MM1 is performed as processing in Steps 201 to 208 before passage through a branching point.

The result of determination in Step 206 is "NO" if the road on which map matching is to be performed by the first map matching processing MM1 is lost or if the first map matching becomes impossible to perform after passage through the branching point and before each of the conditions in Steps 213 and 214 is satisfied. In this case, a check is made as to whether the second map matching processing MM2 is being continued (Step 221). If the second map matching processing MM2 is being continued, it is determined that the vehicle is actually traveling not on the most probable road obtained after passage through the branching point but on the next-precedence candidate road (another branch road). Then the actual vehicle position correction section 20*e* updates the content of the storage 33 by setting as the actual vehicle position the temporary vehicle position stored in the storage 43, and stops the second map matching processing MM2 (Step 222).

Thereafter, the first map matching processing section 20*a* continues the first map matching processing MM1 on the basis of the updated actual vehicle position.

The case of Step S221 in which the second map matching processing is not being continued corresponds to a case where, in the first map matching processing MM1 before passing a branching point, no road is found on which map matching is to be performed. In such a case, the vehicle position is displayed without being corrected by map matching processing.

Figure 13:
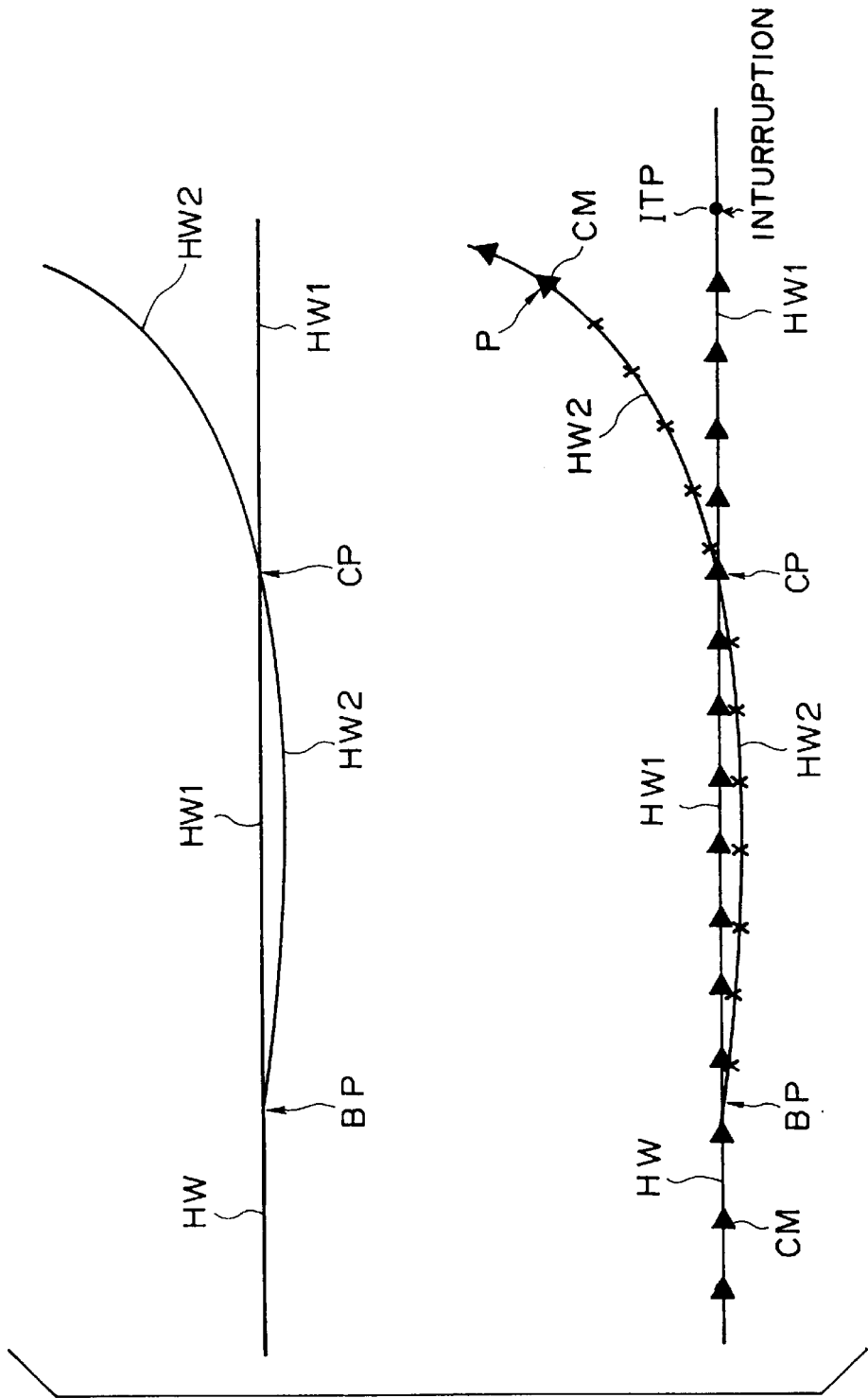
FIG. 13 is a diagram explaining position correction in accordance with the present invention.
Figure 14:
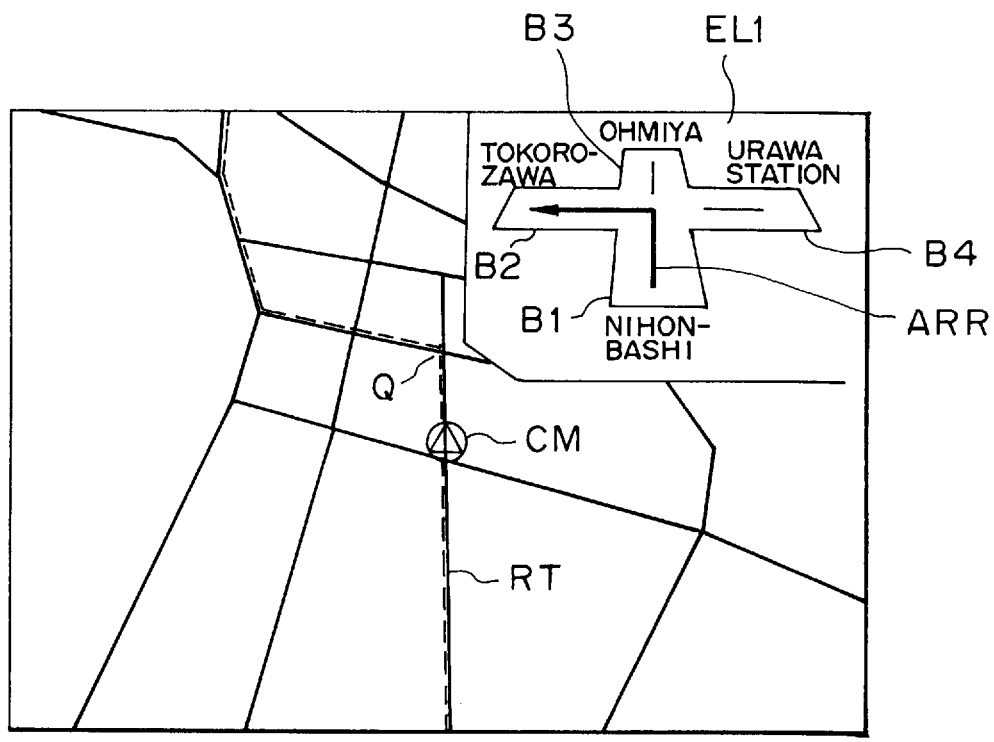
FIG. 14 is a diagram explaining intersection guidance.
Figure 15:
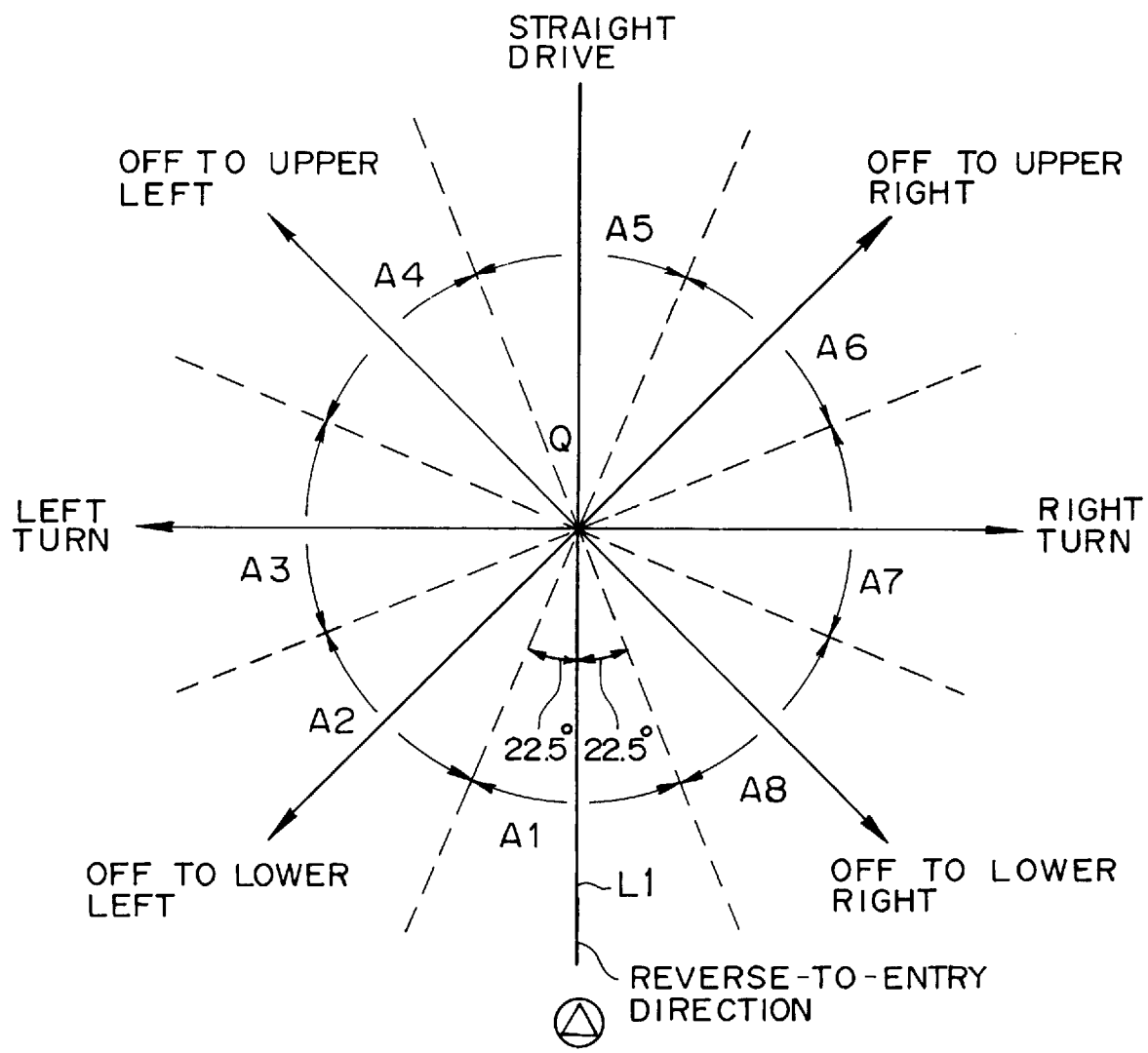
FIG. 15 is a table showing drawing an enlarged intersection diagram.
Figure 17A:
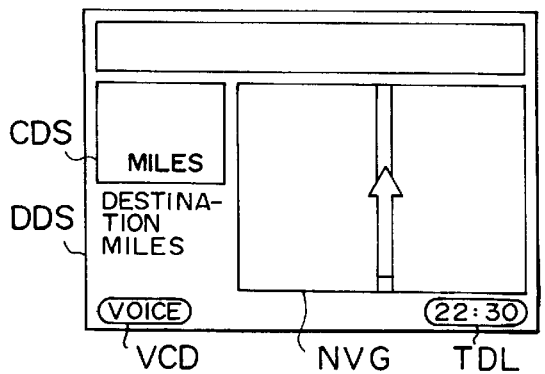
FIGS. 17A to 17F are diagrams of guidance pictures in a navigation system of the U.S.A. type.
Figure 17B:
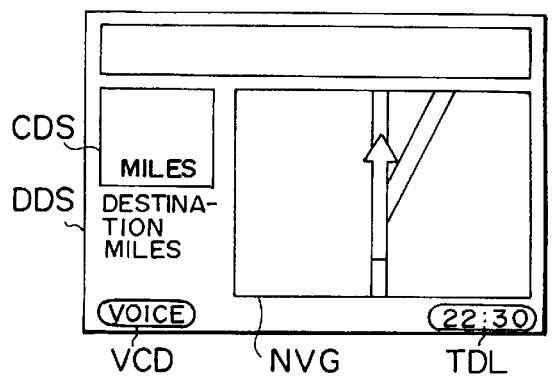
Figure 17C:
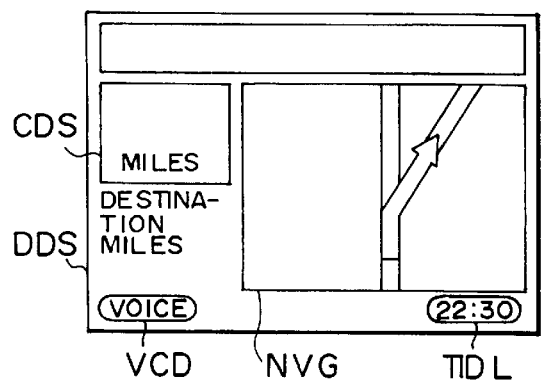
Figure 17D:
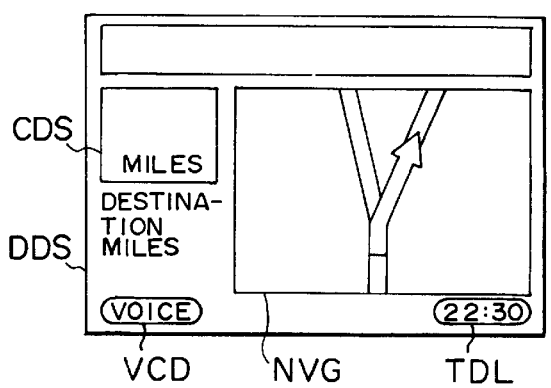
Figure 17E:
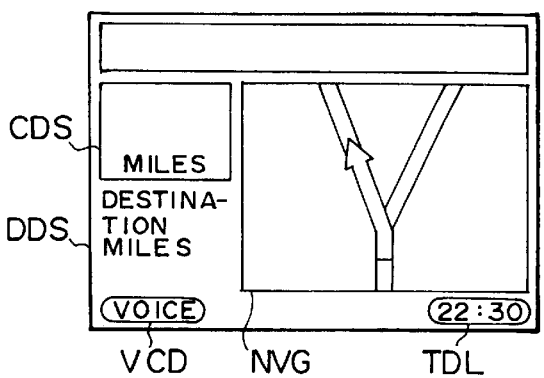
Figure 17F:
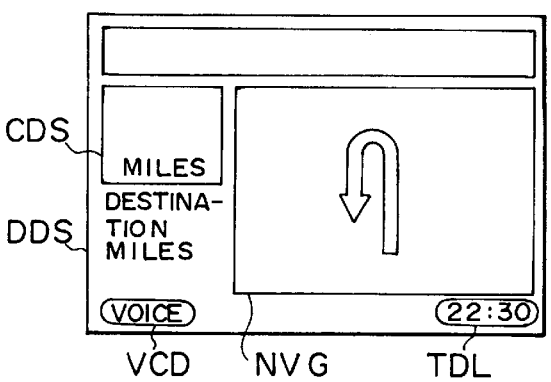
Figure 18:
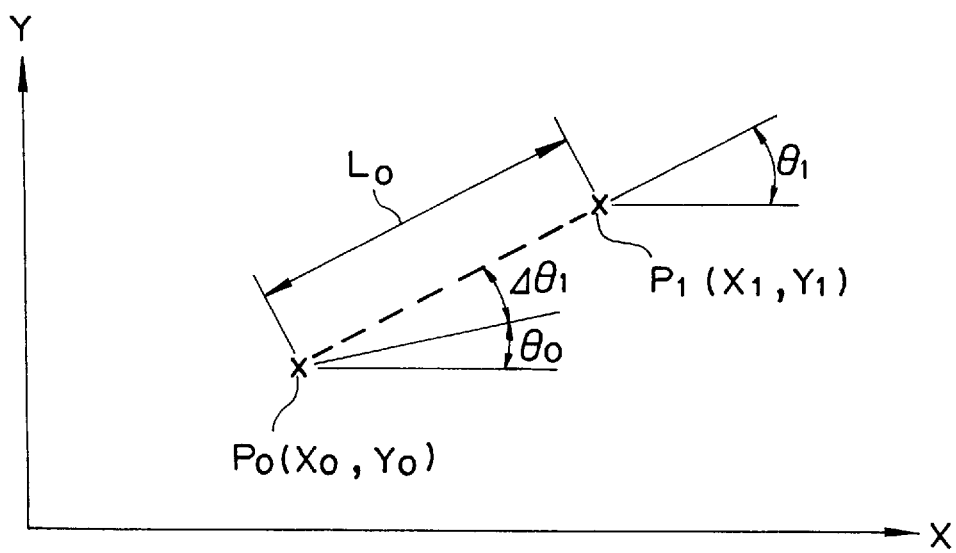
FIG. 18 is a diagram of calculating a position and a bearing in self-contained navigation.
Figure 19:
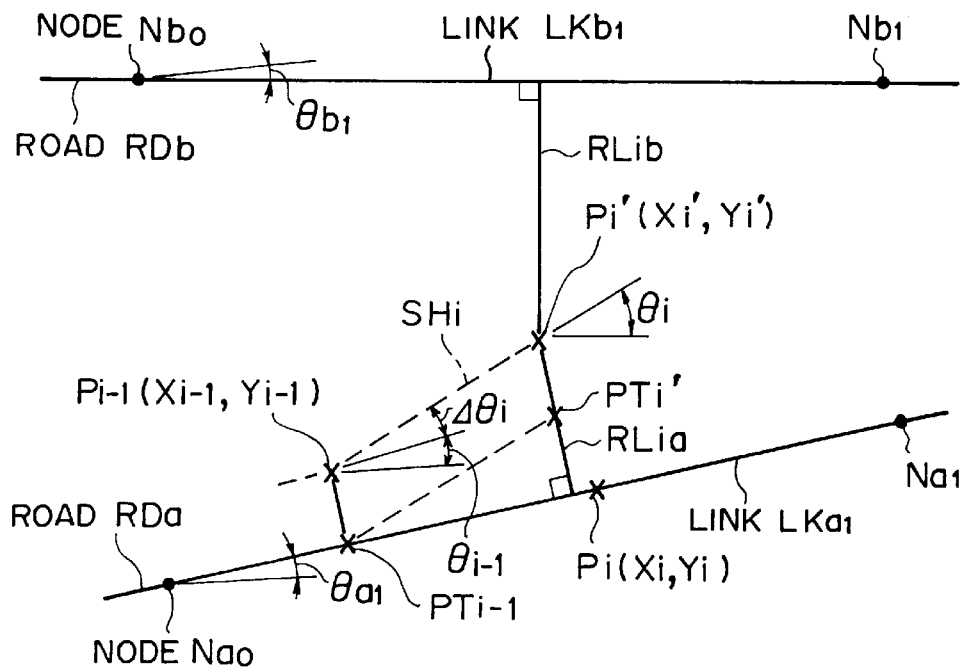
FIG. 19 is a diagram of map matching based on the projection method (Part 1)
Figure 20:
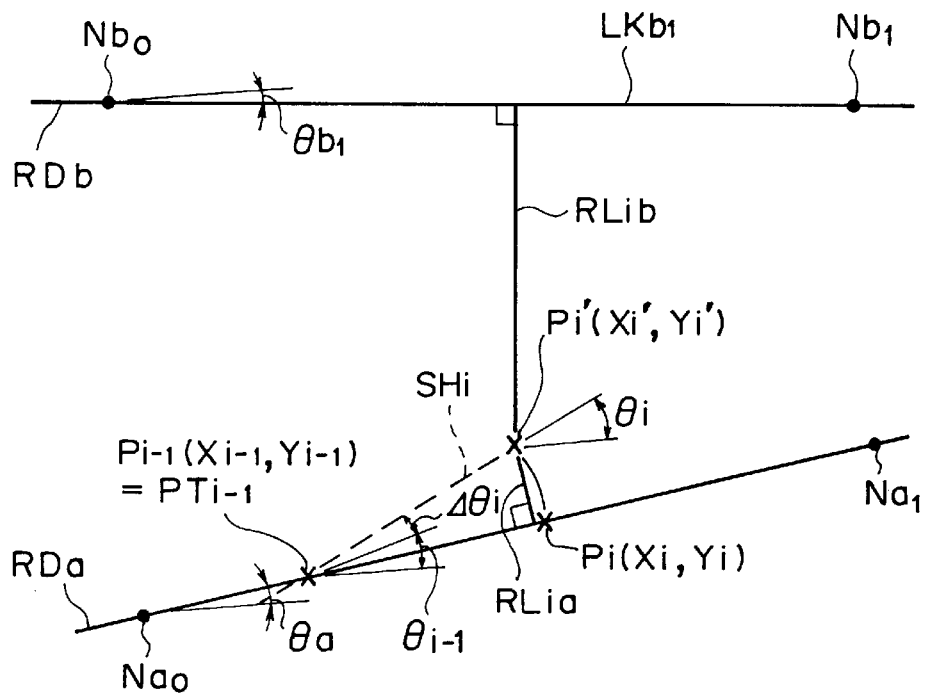
FIG. 20 is a diagram of map matching based on the projection method (Part 2)

FIG. 13 is a diagram explaining correcting the vehicle position in accordance with the present invention. An express highway indicated by line HW diverges into two branch roads HW1and HW2 at a branching point BP. The branch roads HW1 and HW2 extend generally parallel to each other to a two-level crossing point CP and extend away from each other from crossing point CP so that the included angle therebetween gradually increases.

Before the branching point BP is reached, the vehicle position represented by the vehicle position mark CM can be accurately corrected by being brought onto the line representing the express highway HW by map matching processing. After passing the branching point, the first and second map matching processing MM1 and MM2 are performed in parallel with each other until a predetermined condition is established. The vehicle position corrected by the first map matching processing MM1 is regarded as the actual vehicle position and is indicated by the vehicle position mark CM.

When the vehicle passes the branching point BP to enter the branch road HW2, the first map matching processing MM1performed immediately after passing the branching point may result in determining that the most probable road is HW1, while the next-precedence candidate road is HW2. In such a case, the first map matching processing section 20*a* executes the first map matching processing MM1 by assuming that the vehicle is traveling on the most probable road HW1. On the other hand, the second map matching processing section 20*b* executes the second map matching processing MM2 by assuming that the vehicle is traveling on the next-precedence candidate road HW2. Since the map matching processing is performed to correct the vehicle position by a small amount each time a predetermined distance of e.g. 10 m is traveled, the vehicle position is thereafter corrected successively to positions on the wrong road HW1 and the vehicle position mark CM is displayed on the road HW1as long as the roads are generally parallel to each other. However, after passing the two-level crossing point CP, the difference between the direction of the branch road HW2 (the actual bearing of the vehicle) and the direction of the branch road HW1 becomes so large that no most probable road is found by the first map matching at a point ITP. In such a case, the vehicle position is corrected to be the temporary vehicle position P on the next-precedence road HW2 obtained by the second map matching processing MM2. Thereafter, the first map matching processing MM1 is performed by regarding this vehicle position as representing the actual vehicle position.

Thus, even if at a branching point the navigation apparatus erroneously corrects the vehicle position mark to be a position on a road on which the vehicle is not actually traveling, the vehicle position recognized by the navigation apparatus is corrected to be the actual vehicle position on the correct road when the vehicle reaches a point at which the two roads are sufficiently distanced apart by reducing the degree of parallelism therebetween or at which the angular difference therebetween is sufficiently great. As a result, the actual vehicle position can always be determined and the vehicle position mark can be displayed on the road on the map corresponding to the road on which the vehicle is actually traveling.

The present invention has been described with respect to performing the second map matching processing (MM2) only with respect to the next-precedence road. However, if the traveled road diverges into three or more roads, the second map matching processing (MM2) may be executed with respect to the candidate roads other than the most probable roads, and the vehicle position may be corrected to the temporary vehicle position on the third candidate roads if it is determined that the vehicle is not traveling on each of the most probable road and the next precedence candidate road.

In the above-described embodiment, the map matching control section is arranged as shown in FIG. 7. The map matching section, however, may be a separate microcontroller or microprocessor.

The present invention can be modified in other various ways without departing from the scope of the invention set forth in the appended claims, and is to be construed to include changes and modifications as will be recognized by one skilled in the art.

What is claimed is:

1. A vehicle navigation method in which a position of a vehicle is dead-reckoned when a predetermined distance is traveled by the vehicle, a most probable candidate road satisfying a predetermined condition is obtained from the dead-reckoned vehicle position and by map matching processing, the vehicle position is corrected to a position on a most probable candidate road, and the map matching processing is thereafter continued by dead-reckoning the vehicle position, said method comprising:

monitoring whether a point from which two or more branch roads extend has been passed;

obtaining a most probable candidate road and a candidate road different from the most probable candidate road and satisfying said predetermined condition by map matching processing after passing the point;

correcting the dead-reckoned vehicle position to a position on the most probable candidate road to regard the corrected position as an actual vehicle position;

correcting the dead-reckoned vehicle position to be a position on the other candidate road, to set the corrected position as a temporary vehicle position;

thereafter executing map matching processing based on the actual vehicle position and map matching processing based on the temporary vehicle position when the predetermined distance is traveled; and continuing map matching processing by setting the temporary vehicle position as the actual vehicle position when the map matching processing based on the actual vehicle position finds no road satisfying said predetermined condition.

2. A method according to claim 1, wherein said predetermined condition is if a coefficient value, calculated using a distance from the dead-reckoned vehicle position to the road and an angle between a vehicle bearing and a direction of the road at the dead-reckoned vehicle position, is equal to or less than a predetermined value.

3. A method according to claim 1, wherein said predetermined condition is if the road is at a distance from the dead-reckoned vehicle position equal to or less than a predetermined value and at an angle from a vehicle bearing at the dead-reckoned position equal to or less than a predetermined value, and if a coefficient value, calculated using a distance from the dead-reckoned vehicle position to the road and an angle between the vehicle bearing and a direction of the road at the dead-reckoned vehicle position, is equal to or less than a predetermined value.

4. A method according to claim 2 or 3, wherein a road having a smallest value of the coefficient is set as a most probable candidate road, while a road having a next smallest value of the coefficient is set as another candidate road.

5. A method according to claim 1, wherein said point is a branching point at which an angle between the associated branching roads is equal to or less than a predetermined value.

6. A method according to claim 1, further comprising:

monitoring the distance between the actual vehicle position and the temporary vehicle position; and terminating map matching based on the temporary vehicle position when the distance becomes equal to or greater than a predetermined value.

7. A method according to claim 1, further comprising:

monitoring whether map matching processing based on the temporary vehicle position finds no road satisfying said condition; and stopping map matching processing based on the temporary vehicle position if no such road is found.

8. A method according to claim 1, further comprising:

monitoring whether the distance traveled from the branching point is equal to or larger than a predetermined value; and stopping map matching processing based on the temporary vehicle position when the distance traveled becomes equal to or greater than the predetermined value.

9. A vehicle navigation method in which a position of a vehicle is dead-reckoned when a predetermined distance is traveled by the vehicle, a most probable candidate road satisfying a predetermined condition is obtained from the dead-reckoned vehicle position and by map matching processing, the vehicle position is corrected to be a position on the most probable candidate road, and the map matching processing is thereafter continued by dead-reckoning the vehicle position, said method comprising:

monitoring whether a point from which two or more branch roads extend has been passed;

obtaining a most probable candidate road and a second candidate road satisfying said predetermined condition by map matching processing after passing the point;

correcting the dead-reckoned vehicle position to a position on the most probable candidate road to regard the corrected position as an actual vehicle position;

correcting the dead-reckoned vehicle position to a position on the second candidate road to set the corrected position as a temporary vehicle position;

thereafter executing first map matching processing based on the actual vehicle position and second map matching processing based on the temporary vehicle position when the predetermined distance is traveled; and continuing the first map matching processing by setting the temporary vehicle position as the actual vehicle position when the map matching processing based on the actual vehicle position finds no road satisfying said predetermined condition.

10. A method according to claim 9, wherein said predetermined condition is if a coefficient value, calculated using a distance from the dead-reckoned vehicle position to the road and an angle between a vehicle bearing and a direction of the road at the dead-reckoned vehicle position, is equal to or less than a predetermined value.

11. A method according to claim 9, wherein said predetermined condition is if the road is at a distance from the dead-reckoned vehicle position equal to or less than a predetermined value and at an angle from a vehicle bearing at the dead-reckoned position equal to or less than a predetermined value, and if a coefficient value, calculated using a distance from the dead-reckoned vehicle position to the road and an angle between the vehicle bearing and a direction of the road at the dead-reckoned vehicle position, is equal to or less than a predetermined value.

12. A method according to claim 10 or 11, wherein a road having a smallest value of the coefficient is set as a most probable candidate road while a road having a next smallest value of the coefficient is set as a second candidate road.

13. A method according to claim 9, wherein said point is a branching point at which an angle between the associated branching roads is equal to or less than a predetermined value.

14. A method according to claim 9, wherein, provided that a road on which map matching is to be performed by the first map matching processing is found, the second map matching processing based on the temporary vehicle position stops when the distance between the actual vehicle position obtained by the first map matching processing and the temporary vehicle position obtained by the second map matching becomes equal to or greater than a predetermined value.

15. A vehicle position correction method according to claim 9, wherein the second map matching processing based on the temporary vehicle position stops when the second map matching processing finds no candidate road on which map matching is to be performed.

16. A vehicle position correction method according to claim 9, wherein, provided that a road on which map matching is to be performed by the first map matching processing is found, the second map matching processing based on the temporary vehicle position stops when the distance traveled from the branching point becomes equal to or greater than a predetermined value.

17. A vehicle position correction method according to claim 9, wherein the second map matching processing based on the temporary vehicle position stops if in the second map matching processing a coefficient value, calculated from a distance from the dead-reckoned vehicle position to the road and an angle between a vehicle bearing and a direction of the road at the dead-reckoned vehicle position, is equal to or less than a predetermined value.

18. A vehicle navigation apparatus, having a self-contained navigation sensor, where a most probable candidate road satisfying a predetermined condition is obtained from a dead-reckoned vehicle position and by map matching processing and the vehicle position is corrected to a position on a most probable candidate road, and the map matching processing is thereafter continued by dead-reckoning the vehicle position, said apparatus comprising:

means for monitoring whether a point from which two or more branch roads extend has been passed;

means for obtaining a most probable candidate road and a candidate road different from the most probable candidate road and satisfying said predetermined condition by map matching processing after passing the point, correcting the dead-reckoned vehicle position to be a position on the most probable candidate road, to regard the corrected position as an actual vehicle position, and correcting the dead-reckoned vehicle position to be a position on the other candidate road, to set the corrected position as a temporary vehicle position;

means for executing map matching processing based on the actual vehicle position and map matching processing based on the temporary vehicle position each other time the predetermined distance is traveled; and means for continuing map matching processing by setting the temporary vehicle position as the actual vehicle position when the map matching processing based on the actual vehicle position finds no road satisfying said predetermined condition.

19. A vehicle navigation apparatus, having a self-contained navigation sensor, where a most probable candidate road satisfying a predetermined condition is obtained from a dead-reckoned vehicle position and by map matching processing, and the vehicle position is corrected to a position on the most probable candidate road, and the map matching processing is thereafter continued by dead-reckoning the vehicle position, said apparatus comprising:

means for monitoring whether a point from which two or more branch roads extend has been passed;

means for obtaining a most probable candidate road and a second candidate road satisfying said predetermined condition by map matching processing after passing the point, correcting the dead-reckoned vehicle position to be a position on the most probable candidate road to regard the corrected position as an actual vehicle position, and correcting the dead-reckoned vehicle position to a position on the second candidate road to set the corrected position as a temporary vehicle position;

means for executing first map matching processing based on the actual vehicle position and second map matching processing based on the temporary vehicle position each time the predetermined distance is traveled; and means for continuing the first map matching processing by setting the temporary vehicle position as the actual vehicle position when the map matching processing based on the actual vehicle position finds no road satisfying said predetermined condition.

* * * * *